US010837160B2

(12) United States Patent
Hammond et al.

(10) Patent No.: US 10,837,160 B2
(45) Date of Patent: Nov. 17, 2020

(54) METHODS AND APPARATUS FOR FLUID FLOW MONITORING AND LEAK DETECTION

(71) Applicant: Reliance Worldwide Corporation, Atlanta, GA (US)

(72) Inventors: Michael Hammond, Mableton, GA (US); Francis M. Mess, Mableton, GA (US); Samuel Elia, Atlanta, GA (US); Jorge C. Almirall, Atlanta, GA (US); Brian Gestner, Atlanta, GA (US); Jeffrey L. Leaders, Mableton, GA (US); Mathew Shane Smith, Mableton, GA (US)

(73) Assignee: Reliance Worldwide Corporation, Atlanta, GA (US)

( * ) Notice: Subject to any disclaimer, the term of this patent is extended or adjusted under 35 U.S.C. 154(b) by 74 days.

(21) Appl. No.: 16/004,048

(22) Filed: Jun. 8, 2018

(65) Prior Publication Data

US 2018/0291594 A1 Oct. 11, 2018

Related U.S. Application Data

(63) Continuation of application No. 15/636,445, filed on Jun. 28, 2017, which is a continuation of application
(Continued)

(51) Int. Cl.
*F16K 31/02* (2006.01)
*E03B 7/07* (2006.01)
(Continued)

(52) U.S. Cl.
CPC .............. *E03B 7/071* (2013.01); *E03B 7/072* (2013.01); *F17D 5/06* (2013.01); *G01F 1/66* (2013.01);
(Continued)

(58) Field of Classification Search
CPC ............ E03B 7/071; E03B 7/072; F17D 5/06; G01M 3/243; G01M 3/2807;
(Continued)

(56) References Cited

U.S. PATENT DOCUMENTS 3,720,105 A * 3/1973 Cirulis ...................... G01F 1/66
                                                                  73/861.28
3,916,990 A    11/1975 Ruhe et al.
(Continued)

FOREIGN PATENT DOCUMENTS

EP    0 932 029 A2    7/1999
EP    1 803 998 A1    7/2007
(Continued)

OTHER PUBLICATIONS

Final Office Action on U.S. Appl. No. 15/432,678 dated May 31, 2019.
(Continued)

*Primary Examiner* — Minh Q Le
(74) *Attorney, Agent, or Firm* — Foley & Lardner LLP

(57) ABSTRACT

According to at least one aspect, a fluid flow monitoring system includes an ultrasonic sensor for generating measurement signals associated with respective ultrasonic signals propagating through the fluid in the lumen, a shut-off valve for blocking fluid flow in the lumen, and a controller. The controller can be communicatively coupled to the ultrasonic sensor and to the shut-off valve. The controller can be configured to compute a plurality of fluid flow parameter estimates based on a plurality of measurement signals generated by the ultrasonic sensor over a time window while the shut-off valve is open. The controller can obtain an offset value associated with fluid flow parameter measurements during a zero flow state of the shut-off valve. The controller can then check for presence of a fluid leak
(Continued)

event based on the fluid flow parameter estimates over the time window and the offset value.

17 Claims, 23 Drawing Sheets

Related U.S. Application Data

No. 15/432,678, filed on Feb. 14, 2017, which is a continuation of application No. PCT/US2015/045414, filed on Aug. 14, 2015, and a continuation of application No. PCT/US2015/045418, filed on Aug. 14, 2015.

(60) Provisional application No. 62/037,511, filed on Aug. 14, 2014, provisional application No. 62/083,053, filed on Nov. 21, 2014.

(51) Int. Cl.
```
    G01F 1/66       (2006.01)
    G01M 3/24       (2006.01)
    F17D 5/06       (2006.01)
    G01M 3/28       (2006.01)
    G08B 21/18      (2006.01)
    G08B 21/20      (2006.01)
    G08B 5/22       (2006.01)
```
(52) U.S. Cl.
CPC ............. *G01F 1/662* (2013.01); *G01F 1/667* (2013.01); *G01M 3/243* (2013.01); *G01M 3/2807* (2013.01); *G01M 3/2815* (2013.01); *G08B 5/222* (2013.01); *G08B 21/182* (2013.01); *G08B 21/20* (2013.01)

(58) Field of Classification Search
CPC ........ G01M 3/2815; G01F 1/66; G01F 1/662; G01F 1/667; G08B 5/222; G08B 21/182; G08B 21/20
USPC ....... 137/487.5; 251/129.04, 129.08, 315.01; 73/861.18, 861.25, 861.26
See application file for complete search history.

(56) References Cited

U.S. PATENT DOCUMENTS

| | | | |
|---|---|---|---|
| 4,112,494 A | 9/1978 | Elliott et al. | |
| 4,911,006 A | 3/1990 | Hargarten et al. | |
| 5,038,820 A * | 8/1991 | Ames | F16K 31/02 137/460 |
| 5,139,044 A * | 8/1992 | Otten | A01G 25/16 137/80 |
| 5,343,737 A | 9/1994 | Baumoel | |
| 5,369,998 A * | 12/1994 | Sowerby | G01F 1/66 73/861.04 |
| 5,568,825 A * | 10/1996 | Faulk | E03B 7/071 137/624.11 |
| 5,771,920 A * | 6/1998 | Jewett | E03B 7/071 137/460 |
| 5,782,263 A * | 7/1998 | Isaacson, Jr. | F16K 17/20 137/459 |
| 6,209,576 B1 * | 4/2001 | Davis | E03B 7/071 137/487.5 |
| 6,237,618 B1 * | 5/2001 | Kushner | E03B 7/071 137/1 |
| 6,286,732 B1 * | 9/2001 | Daansen | A47K 5/1207 137/846 |
| 6,317,051 B1 * | 11/2001 | Cohen | G01M 3/2807 340/603 |
| 6,374,846 B1 * | 4/2002 | DeSmet | E03B 7/071 137/15.01 |
| 6,671,893 B1 * | 1/2004 | Quintana | E03D 3/00 4/427 |
| 6,725,878 B1 | 4/2004 | Nawa et al. | |
| 7,093,502 B2 | 8/2006 | Kupnik et al. | |
| 8,618,941 B2 | 12/2013 | Javey et al. | |
| 8,973,424 B2 | 3/2015 | Wiktor | |
| 9,170,140 B2 * | 10/2015 | Brown | G01F 1/662 |
| 9,297,150 B2 * | 3/2016 | Klicpera | E03B 7/071 |
| 9,749,792 B2 | 8/2017 | Klicpera | |
| 2004/0050790 A1 | 3/2004 | Baarman et al. | |
| 2004/0238011 A1 | 12/2004 | Weber | |
| 2007/0079792 A1 | 4/2007 | Dingler et al. | |
| 2008/0250870 A1 * | 10/2008 | Rhodes | G01F 1/66 73/861.27 |
| 2009/0007625 A1 * | 1/2009 | Ao | G01F 1/668 73/1.31 |
| 2009/0124988 A1 | 5/2009 | Coulthard | |
| 2009/0303057 A1 | 12/2009 | Brown | |
| 2010/0307600 A1 * | 12/2010 | Crucs | E03B 7/071 137/2 |
| 2011/0022012 A1 | 1/2011 | Kerr et al. | |
| 2011/0073189 A1 * | 3/2011 | Elbert | E03B 7/071 137/1 |
| 2011/0142700 A1 | 6/2011 | Gura et al. | |
| 2011/0173249 A1 | 7/2011 | Lee et al. | |
| 2011/0290350 A1 * | 12/2011 | Slupecki | G05D 7/0635 137/552.7 |
| 2012/0090702 A1 * | 4/2012 | Shalev | G01F 1/66 137/486 |
| 2012/0324985 A1 * | 12/2012 | Gu | G01F 25/0007 73/40.5 R |
| 2013/0080081 A1 | 3/2013 | Dugger et al. | |
| 2013/0167656 A1 * | 7/2013 | Takemura | G01F 1/66 73/861.28 |
| 2013/0174649 A1 * | 7/2013 | Hains | G01M 3/3227 73/40.5 R |
| 2013/0174650 A1 | 7/2013 | Wiktor | |
| 2013/0177455 A1 | 7/2013 | Kamen et al. | |
| 2013/0269447 A1 * | 10/2013 | Takemura | G01F 1/66 73/861.27 |
| 2013/0282355 A1 | 10/2013 | Hosking et al. | |
| 2014/0069207 A1 | 3/2014 | Leaders et al. | |
| 2014/0196802 A1 * | 7/2014 | Guy | E03B 7/071 137/486 |
| 2014/0345373 A1 * | 11/2014 | Akita | G01F 9/00 73/114.52 |
| 2014/0348205 A1 * | 11/2014 | Shaw | G01M 3/002 374/142 |
| 2015/0277447 A1 * | 10/2015 | Schmidt | F16K 37/0091 137/10 |
| 2016/0163177 A1 | 6/2016 | Klicpera | |
| 2017/0152648 A1 | 6/2017 | Hammond et al. | |
| 2017/0298597 A1 | 10/2017 | Hammond et al. | |
| 2018/0230681 A1 * | 8/2018 | Poojary | G01F 15/063 |
| 2018/0328811 A1 | 11/2018 | Mielke et al. | |
| 2018/0334786 A1 * | 11/2018 | Sharratt | F16K 51/00 |

FOREIGN PATENT DOCUMENTS

| | | |
|---|---|---|
| WO | WO-01/04596 A2 | 1/2001 |
| WO | WO-2014/020252 A1 | 2/2014 |

OTHER PUBLICATIONS

Notice of Allowance on U.S. Appl. No. 14/996,003 dated May 8, 2019.

Office Action for CA Application No. 2,960,959 dated Nov. 8, 2018.

Office Action for CA Application No. 3,007,529 dated Apr. 10, 2019.

Office Action for EP Application No. 15832312.1 dated Mar. 22, 2019.

Final Office Action on U.S. Appl. No. 14/996,003 dated Nov. 29, 2018.

Non-Final Office Action on U.S. Appl. No. 15/432,678 dated Nov. 16, 2018.

(56) References Cited

OTHER PUBLICATIONS

Bill Gauley, "ULF Toilet Performance Monitoring Program" 2001 Veritec Consulting; http://www.map-testing.com/assets/files/Veritec%20ULF%20Toilet%20Performance%20Monitoring%20Program.pdf.
Bilmes, "A Gentle Tutorial of the EM Algorithm and its Application to Parameter Estimation for Gaussian Mixture and Hidden Markov Models", 1998 International Computer Science Institute Berkeley CA.
Dong et al., "Deep Sparce Coding Based Recursive Disaggregation Model for Water Conservation", 2013, IJCAI '13 Proceedings of the Twenty-Third joint conference on Artificial Intelligence, pp. 2804-2810 AAAI Press 2013.
Dong, et al., "Deep Sparse Coding Based Recursive Disaggregation Model for Water Conservation", Aug. 2013; Dept. of Computer Science, Virginia Tech, US.
Examination Report for CA Appl. No. 2,960,959, dated Jan. 2, 2018 (SON-005CA).
Examination Report for CA Application No. 2,960,772 dated Dec. 8, 2017 (SON-007CA).
Extended Search Report for EP Application No. 15832312.1 dated Mar. 13, 2018.
Final Office Action for U.S. Appl. No. 14/996,003 dated Jan. 6, 2017.
Fontdecaba Sara et al: "An Approach to Disaggregating Total Household Water Consumption into Major End-Uses", Water Resources Management, Springer Netherlands, Dordrecht, vol. 27, No. 7, Jan. 27, 2013 (Jan. 27, 2013), pp. 2155-2177, XP035375027,ISSN: 0920-4741, DOI: 10.1007/S11269-013-0281-8.
Gauley, Bill,"ULF Toilet Performance Monitoring Program" Report, Aug. 2001; Veritec Consulting Inc.
Hyung Sui Kim, Unsupervised Disaggregation of Low Frequency Power Measurements, 2012, Thesis University of Illinois.
Hyungsul, et al., "Unsupervised Disaggregation of Low Frequency Power Measurements"; University of Illinois, 2012.
International Preliminary Report on Patentability for PCT/US2015/045320 dated Feb. 23, 2017(SON-005PC).
International Preliminary Report on Patentability on PCT/US2015/045414 dated Feb. 23, 2017(SON-007PC1).
International Preliminary Report on Patentability on PCT/US2015/045418 dated Feb. 23, 2017 (SON-007PC2).
International Search Report & Written Opinion for PCT Application No. PCT/US2015/045320 dated Jul. 1, 2016 (SON-005PC).
International Search Report & Written Opinion for PCT Application No. PCT/US2015/045414 dated Nov. 24, 2015 (SON-007PC1).
International Search Report & Written Opinion for PCT Application No. PCT/US2015/045418 dated Nov. 23, 2015 (SON-007PC2).
Nguyen Khoi Anh et al: "An autonomous and intelligent expert system for residential water end-use classification" Expert Systems With Applications, vol. 41, No. 2, Feb. 1, 2014 (Feb. 1, 2014), pp. 342-356, XP028733598.
Nguyen, et al., "An autonomous and intelligent expert system for residential water end-use classification"; Expert Systems with Applications 41 (2014) 342-356; vol. 41, Issue 2, Feb. 1, 2014, pp. 342-356.
Non-Final Office Action on U.S. Appl. No. 14/996,003 dated Jun. 29, 2018.
Office Action for U.S. Appl. No. 14/996,003 dated May 23, 2016.
Office Action for U.S. Appl. No. 14/996,003 dated Aug. 10, 2017.
Office Action for U.S. Appl. No. 14/996,003 dated Jan. 6, 2017.
Supplementary European Search Report for EP 15832312.1 dated Mar. 13, 2018 from the European Patent Office.
Supplementary European Search Report for EP 15832336.0 dated Apr. 10, 2018.
U.S. Final Office Action for U.S. Appl. No. 14/996,003 dated Feb. 8, 2018.
Vanek, et al., "Estimation of Single-Gaussian and Gaussian Mixture Models for Pattern Recognition"; University of West Bohemia, Dept. of Cybernetics; Dec. 2013.
Foreign Action other than Search Report on AU Appl. Ser. No. 2015301406 dated Apr. 9, 2020 (3 pages).
Non-Final Office Action on U.S. Appl. No. 15/636,445 dated Apr. 20, 2020 (13 pages).
Notice of Allowance on U.S. Appl. No. 16/536,704 dated Apr. 30, 2020 (9 pages).
Cai et al., "Pattern recognition using Markov random field models", Pattern Recognition, vol. 35, 2002 (accepted Mar. 5, 2001), pp. 725-733.
Carboni et al., "Contextualising Water Use in Residential Settings: A Survey of Non-Intrusive Techniques and Approaches", Sensors, May 20, 2016, pp. 1-20.
Deoreo et al., "flow Trace Analysis to assess water use", American Water Works Association, Jan. 1996, pp. 79-90.
Final Office Action on U.S. Appl. No. 15/432,678 dated Feb. 21, 2020 (10 pages).
Foreign Action other than Search Report on CA 3007529 dated Mar. 4, 2020 (5 pages).
Mounce et al., "Pattern matching and associative artificial neural networks for water distribution system time series data analysis", Journal of Hydroinformatics. vol. 16, No. 3, May 2014, pp. 617-632.
Otaki et al., "Micro-component survey of residential water consumption in Hanoi", Water Science & Technology: Water Supply, 13.2, Mar. 2013, pp. 469-478.
Srinivasan et al., "WaterSense: Water Flow Disaggregation Using Motion Sensors", BuildSys'11, Nov. 1, 2011 pp. 19-24.
Non-Final Office Action on U.S. Appl. No. 15/636,445 dated May 26, 2020 (6 pages).
Notice of Allowance on U.S. Appl. No. 16/536,704 dated Jun. 8, 2020 (2 pages).
Supplemental Notice of Allowance on U.S. Appl. No. 16/536,704 dated May 19, 2020 (2 pages).
Final Office Action on U.S. Appl. No. 15/636,445 dated Dec. 19, 2019.
Foreign Action other than Search Report on CA 2960772 dated Oct. 22, 2019.
Foreign Action other than Search Report on CA 2960959 dated Nov. 4, 2019.
Foreign Action other than Search Report on MX MX/a/2017/002031 dated Jan. 16, 2020.
Foreign Action other than Search Report on MX MX/a/2017/002031 dated Sep. 6, 2019.
Giurco et al., "Residential End-Use Measurement Guidebook: A Guide to Study Design, Sampling and Technology", Institute for Sustainable Futures, UTS and CSIRO, 2008 (56 pages).
Non-Final Office Action on U.S. Appl. No. 15/432,678 dated Nov. 1, 2019.
Non-Final Office Action on U.S. Appl. No. 15/636,445 dated Aug. 2, 2019 (17 pages).
Notice of Allowance on U.S. Appl. No. 14/996,003 dated Jul. 15, 2019 (3 pages).
Notice of Allowance on U.S. Appl. No. 16/536,704 dated Jan. 29, 2020.
Office Action on MX MX/a/2017/002030 dated Jul. 3, 2019 (1 page).
Canadian Office Action other than Search Report on CA Appl. Ser. No. 2960772 dated Aug. 18, 2020 (3 pages).
Canadian Office Action other than Search Report on CA Appl. Ser. No. 2960959 dated Aug. 6, 2020 (3 pages).
U.S. Notice of Allowance on U.S. Appl. No. 15/432,678 dated Aug. 28, 2020 (3 pages).

\* cited by examiner

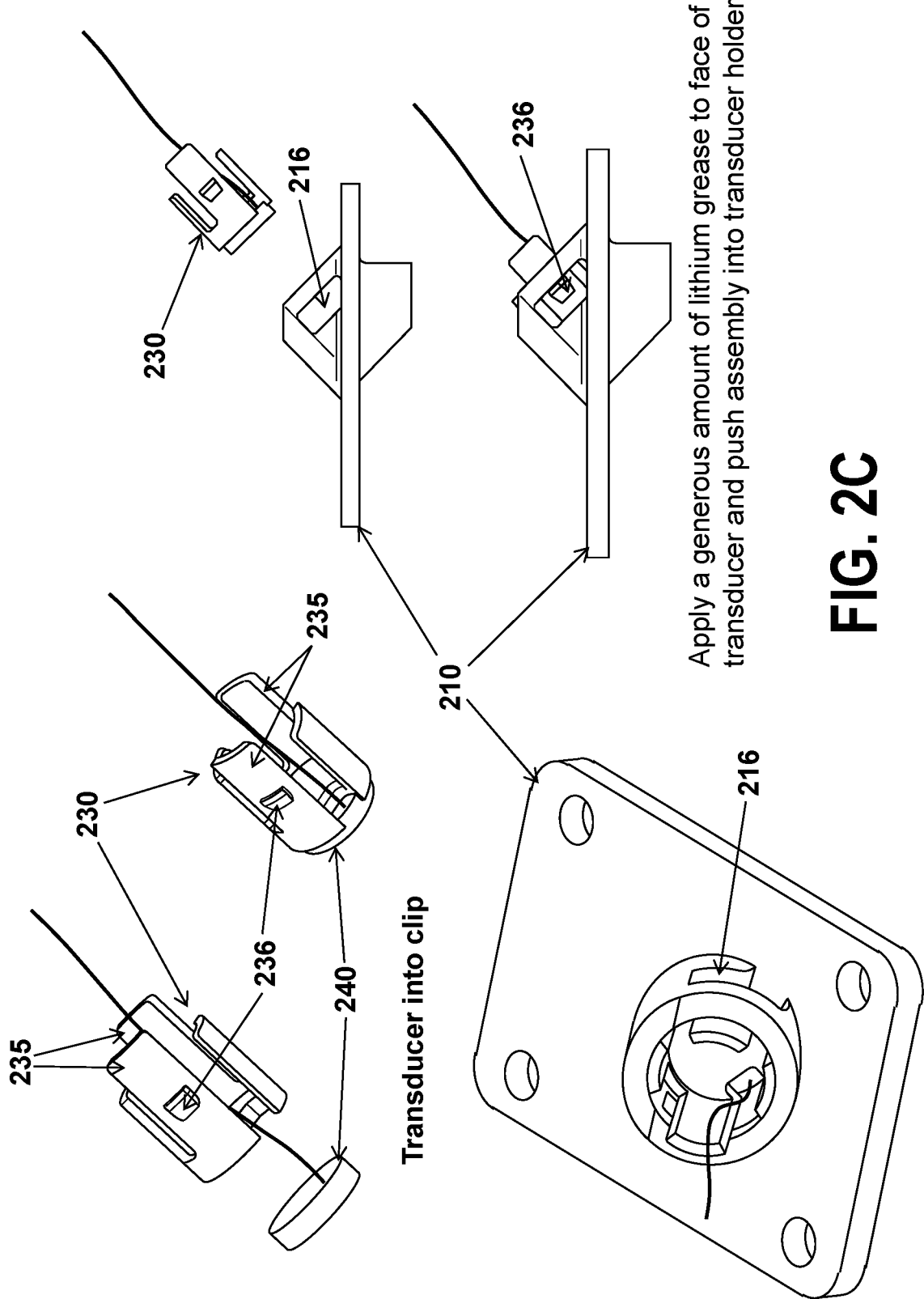

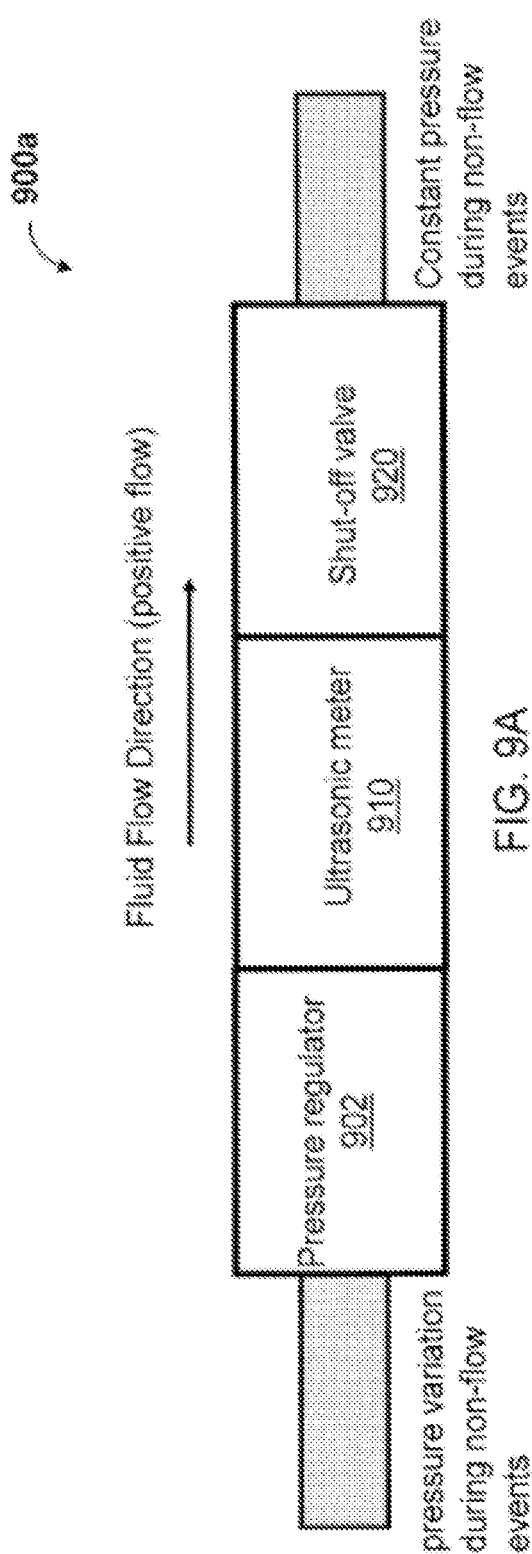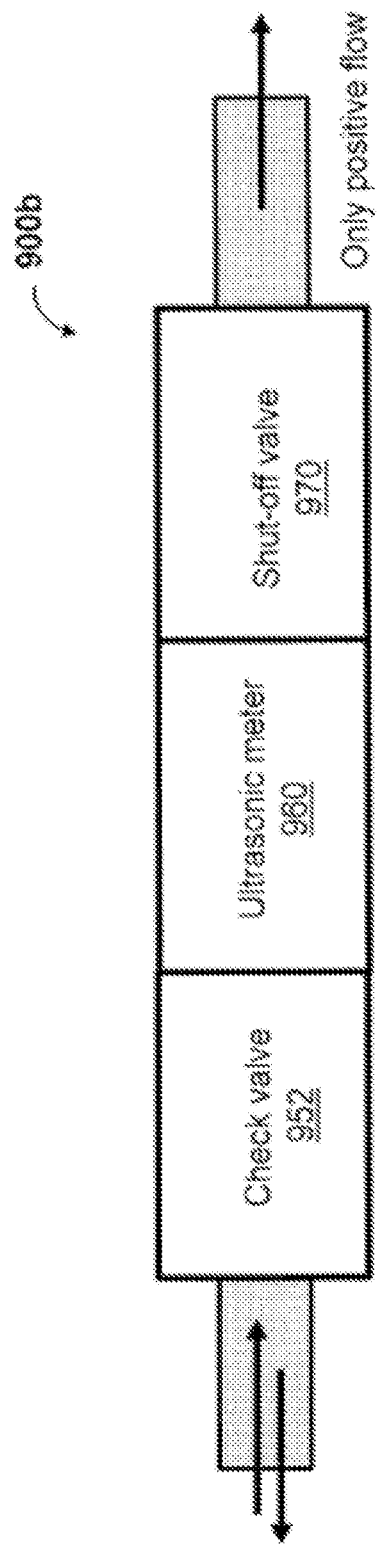

METHODS AND APPARATUS FOR FLUID FLOW MONITORING AND LEAK DETECTION

RELATED APPLICATION

This application is a continuation of U.S. application Ser. No. 15/636,445, entitled "Methods and Apparatus for Fluid Flow Monitoring and Leak Detection" filed on Jun. 28, 2017, which is a continuation of U.S. application Ser. No. 15/432,678, entitled "Methods and Apparatus for Fluid Flow Monitoring and Leak Detection" filed on Feb. 14, 2017, which is a continuation of PCT/US2015/45414, entitled "Methods and Apparatus for Fluid Flow Monitoring and Leak Detection" filed on Aug. 14, 2015 and PCT/US2015/45418, entitled "Methods and Apparatus for Fluid Flow Monitoring and Leak Detection" filed on Aug. 14, 2015 which in turn both claim priority to U.S. Provisional Application No. 62/037,511, entitled "Devices and System for Automatic Monitoring of Water flow in Plumbing Systems" filed on Aug. 14, 2014 and U.S. Provisional Application No. 62/083,053, entitled "System and Apparatus Integrating Water Flow sensors and Shut-off Valve" filed on Nov. 21, 2014. Each of these applications is incorporated herein by reference in their entirety.

BACKGROUND

Fluid distribution systems distribute fluid from a source to one or more end points. For instance, a water distribution system associated with a house or building includes pipes and pipe fittings arranged to distribute water to fixtures (such as a sink, toilet flush, tub or a combination thereof) and appliances (such as a dish washer, a washing machine or a combination thereof) in the house or building. Also, natural gas can be distributed to stoves or heaters in a house or building through a respective distribution system.

The amount of fluid distributed into a respective fluid distribution system can be measured through a flow meter (such as a water meter). Flow meters are typically used to measure cumulative fluid usage for monetary charging purposes.

SUMMARY

According to at least one aspect, a fluid flow monitoring system for monitoring fluid flow through a lumen includes an ultrasonic sensor for generating measurement signals associated with respective ultrasonic signals propagating through the fluid in the lumen, a shut-off valve for blocking fluid flow in the lumen, and a controller. The controller can be communicatively coupled to the ultrasonic sensor and to the shut-off valve. The controller can be configured to compute a plurality of fluid flow parameter (such flow rate or flow velocity) estimates based on a plurality of measurement signals generated by the ultrasonic sensor over a time window while the shut-off valve is open. The controller can obtain an offset value associated with fluid flow parameter measurements during a zero flow state of the shut-off valve. The controller can then check for presence of a fluid leak event based on the fluid flow parameter estimates over the time window and the offset value.

According to at least one other aspect, a method for monitoring fluid flow within a lumen includes computing, by a processor, a plurality of fluid flow parameter estimates based on the measurement signals generated by an ultrasonic over a time window while a shut-off valve associated with the lumen is open. The method also includes checking, by the processor, for presence of a fluid leak event based on the fluid flow parameter estimates over the time window and the offset value.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The accompanying drawings, which are incorporated in and constitute a part of this specification, illustrate embodiments of the disclosed technology and together with the description serve to explain principles of the disclosed technology.

FIGS. 2A-2C show diagrams illustrating a mechanism for mounting transducers to a lumen structure.

FIGS. 9A and 9B are block diagrams of fluid flow monitoring systems employing pressure regulation.

DETAILED DESCRIPTION

Figure 1A:
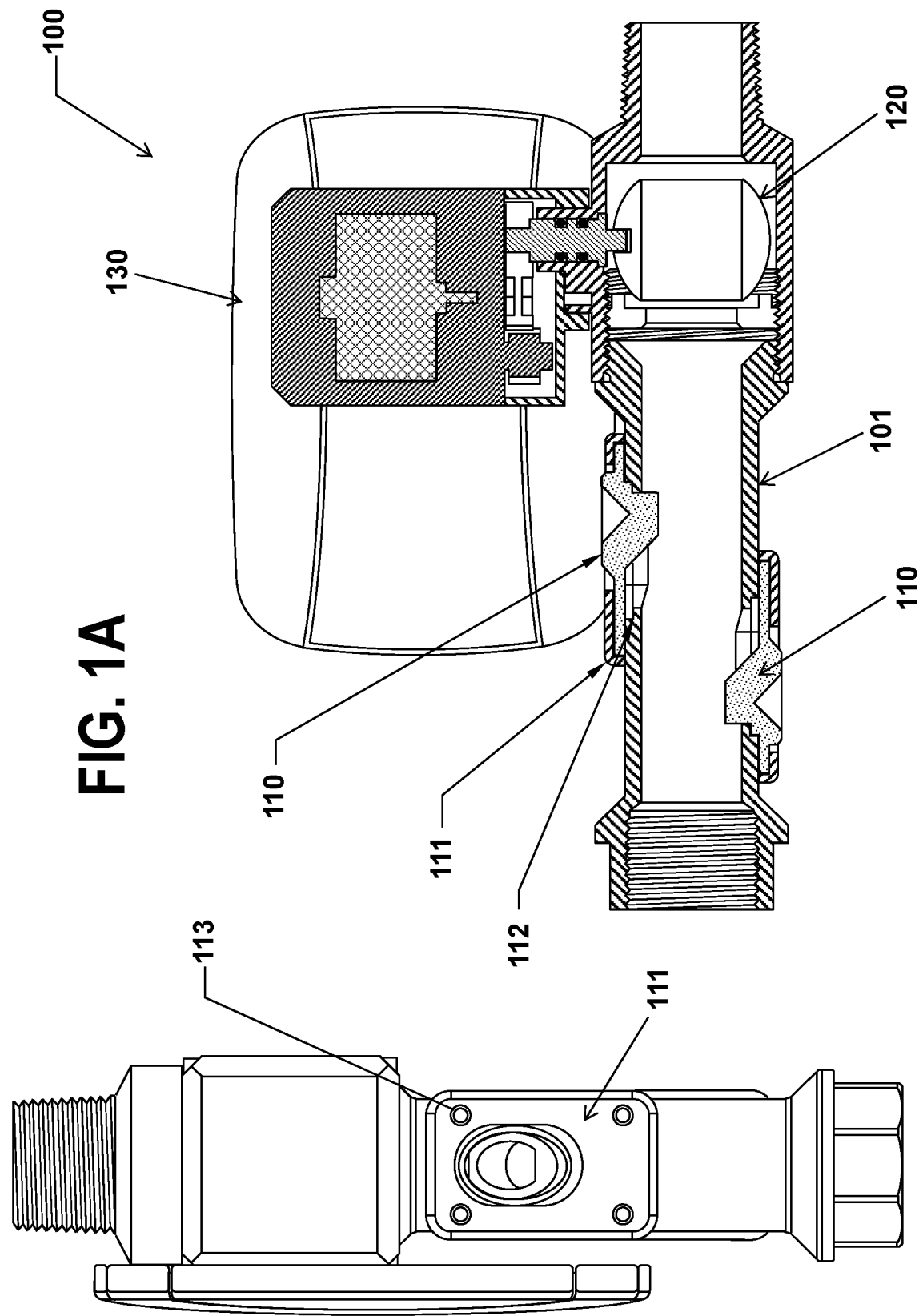
FIGS. 1A-1D show multiple diagrams depicting a fluid flow monitoring system integrating an ultrasonic fluid flow meter and a shut-off valve.

Following below are more detailed descriptions of various concepts related to, and embodiments of, inventive systems, methods and apparatus for providing fluid flow monitoring. Features of example fluid flow monitoring systems or devices can include, but are not limited to, real-time usage information, accurate metering at low and high flow rates, detection of fluid leaks, automatic shut off of fluid flow in response to fluid leak detection, no-flow state detection and flow rate drift compensation, and reverse flow mitigation. The various concepts introduced above and discussed in greater detail below may be implemented in any of numerous ways, as the disclosed concepts are not limited to any particular manner of implementation. Examples of specific implementations and applications are provided primarily for illustrative purposes.

Systems, devices and methods described in the current disclosure allow detection and monitoring of fluid leak events in a fluid distribution system. In particular, a fluid flow monitoring system integrating an ultrasonic fluid meter and a shut-off valve is capable of automatically actuating the shut-off valve to shut fluid flow upon detecting a fluid leak event. The ultrasonic fluid meter includes ultrasonic transducers capable of transmitting/receiving ultrasonic signals that propagate through the fluid flowing in a lumen or a fluid supply line such as a pipe. Fluid flow speed or fluid flow rate can be detected based on one or more features of an ultrasonic signal received at one or more ultrasonic transducers. Measured fluid flow rate or measured fluid flow speed can experience drifting (such as change by an offset value) due to variation in the temperature of the fluid, the transducers or a combination thereof. The fluid flow monitoring system can be capable of detecting a no-flow state and calibrate for drift(s) in measured fluid flow parameters. The fluid flow meter can be designed to allow for transducers removal without disturbing or interrupting the fluid flow.

While the systems, devices and methods in the current disclosure are described in terms of ultrasonic transducers, alternative flow rate sensors may include magnetic field sources or impellers disposed, for example, at the head or end of a supply line. In some implementations, capacitive sensing in addition to acoustic, mechanical, ultrasonic, and/or magnetic sensing can be employed. The systems, devices and methods described in the current disclosure can be used to detect and manage leaks in fluid distribution systems such as water distribution systems, natural gas distribution systems, oil distribution systems, or other fluid distribution systems.

In a building, home, factory, or field of operation, a fluid distribution system can be sourced by a single supply line (or main pipe) or multiple supply lines. Placing a fluid flow monitoring system coupled to such supply line(s) can allow monitoring the fluid flow speed or the fluid flow rate into the fluid distribution system. In some implementations, multiple fluid flow monitoring systems can be disposed in connection with a plurality of supply lines, such as pies, to monitor fluid flow at different points of the fluid distribution system. Based on detected flow speed, the flow rate or the total volume of fluid passing through a supply line can be computed. The fluid flow monitoring system(s) can be configured to provide a high fluid flow rate (or fluid flow velocity) estimation accuracy over a large dynamic range, therefore, allowing accurate detection of relatively low and large leaks.

Ultrasonic-based fluid sensors and meters (invasive or non-invasive) are capable of accurately estimating fluid flow rates (or fluid flow velocities) across a respective large range of flow rate or flow velocity values. However, ultrasonic meters can be subject to drift(s) in measured fluid flow parameters such as fluid flow rate or fluid flow velocity. For example, drifts in measured fluid flow parameters can occur as a result of temperature variations of the environment, temperature variations of the fluid, temperature variations of the transducers, variations in electrical properties of the transducers or a combination thereof. Such measurement drift(s) can result in added offset(s) to measured or estimated fluid flow parameter values (such as ultrasonic signal propagation time in the fluid, fluid flow velocity or fluid flow rate) and therefore can substantially degrade the accuracy of the measured or estimated fluid flow parameters. The reduction in measurement or estimation accuracy can in turn lead to false alarms or missed targets when detecting fluid leak events.

In some implementations, the effect of such measurement drift can be reduced by repeatedly estimating the drift offset over time and calibrating the measured or estimated fluid flow parameters based on estimates of the drift offset(s). That is, the drift offset(s) can be determined and then subtracted from subsequent measurements/estimates of respective fluid flow parameters. Determining the drift offset can be achieved by performing a zero-out process by the fluid flow monitoring system, employing an inline leak detector to distinguish between zero flow and non-zero flow states, modeling measured fluid flow parameters below a given threshold value as potential estimates of the drift offset or employing measurements from sensors for sensing temperature or sensing electrical properties of the transducers. Calibrating the fluid flow parameters measured/estimated by the fluid flow monitoring system based on estimates of drift offset(s) improves fluid leak detection and therefore allows reduction in the number and gravity of fluid leak events, if any, that still may not be detected.

Detection of fluid leaks, as accurate as it may be, may not be sufficient to avoid wasting fluid resources and prevent leak-caused damage(s). Specifically, adequate management of fluid leaks would include timely acting on knowledge of a leak event by taking proper action(s) such as preventing any additional fluid flow into the fluid distribution system. While such actions can be performed by a user manually turning a shut-off valve coupled to the fluid distribution system, reacting manually to a detected leak requires immediate physical access to the source of the fluid distribution system and/or a valve thereof. A user can also command an electro-mechanical shut-off valve (for example through a corresponding user interface) to stop fluid flow into the distribution system. Even if such command can be initiated remotely (for example, if a shut-off valve is integrated with a wired or wireless communication system), timely initiation of the command would still involve communication of a leak event to the user, the user becoming aware of the leak event and timely action by the user.

In some implementations, the fluid flow monitoring system (or device) allows accurate detection of leak events and timely automatic action in response to a detected leak event. In particular, the fluid flow monitoring system disclosed in the current disclosure includes both an ultrasonic fluid flow meter and an electro-mechanical shut-off valve configured to be automatically actuated to stop fluid flow when a leak event is detected. The fluid flow monitoring system allows for continuous monitoring of fluid flow velocity (or fluid flow rate), checking for fluid leak events based on measured fluid flow parameter (e.g., fluid flow velocity or fluid flow rate) values, and automatic triggering of valve actuation based on the measured fluid flow parameter values.

Figure 1B:
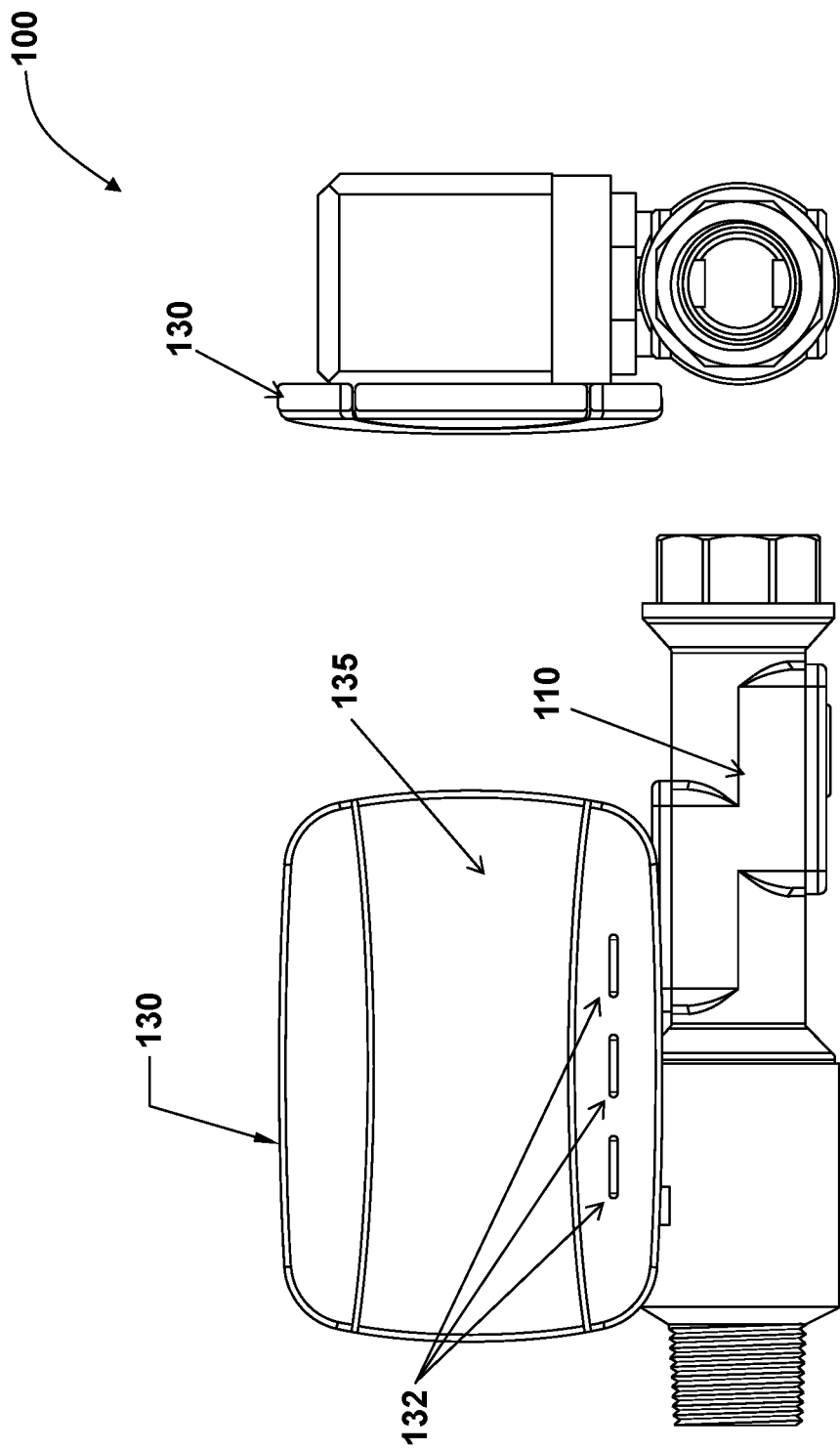
Figure 1C:
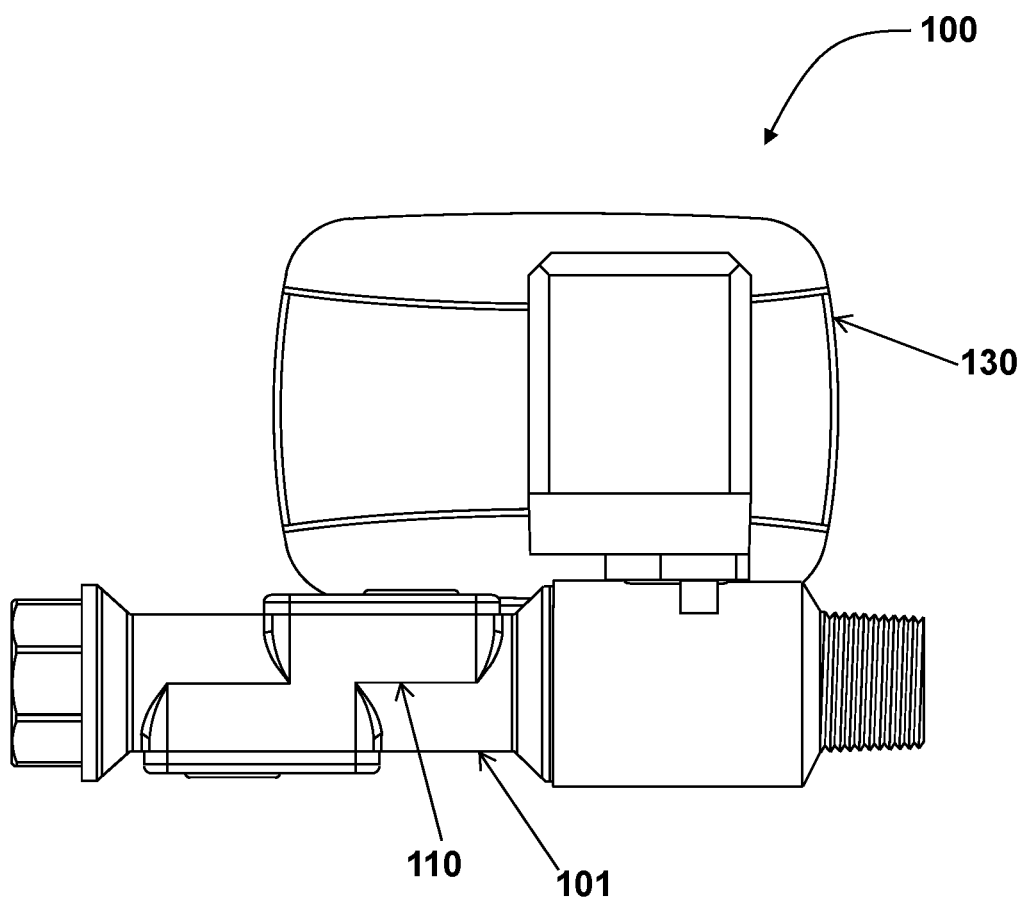
Figure 1D:
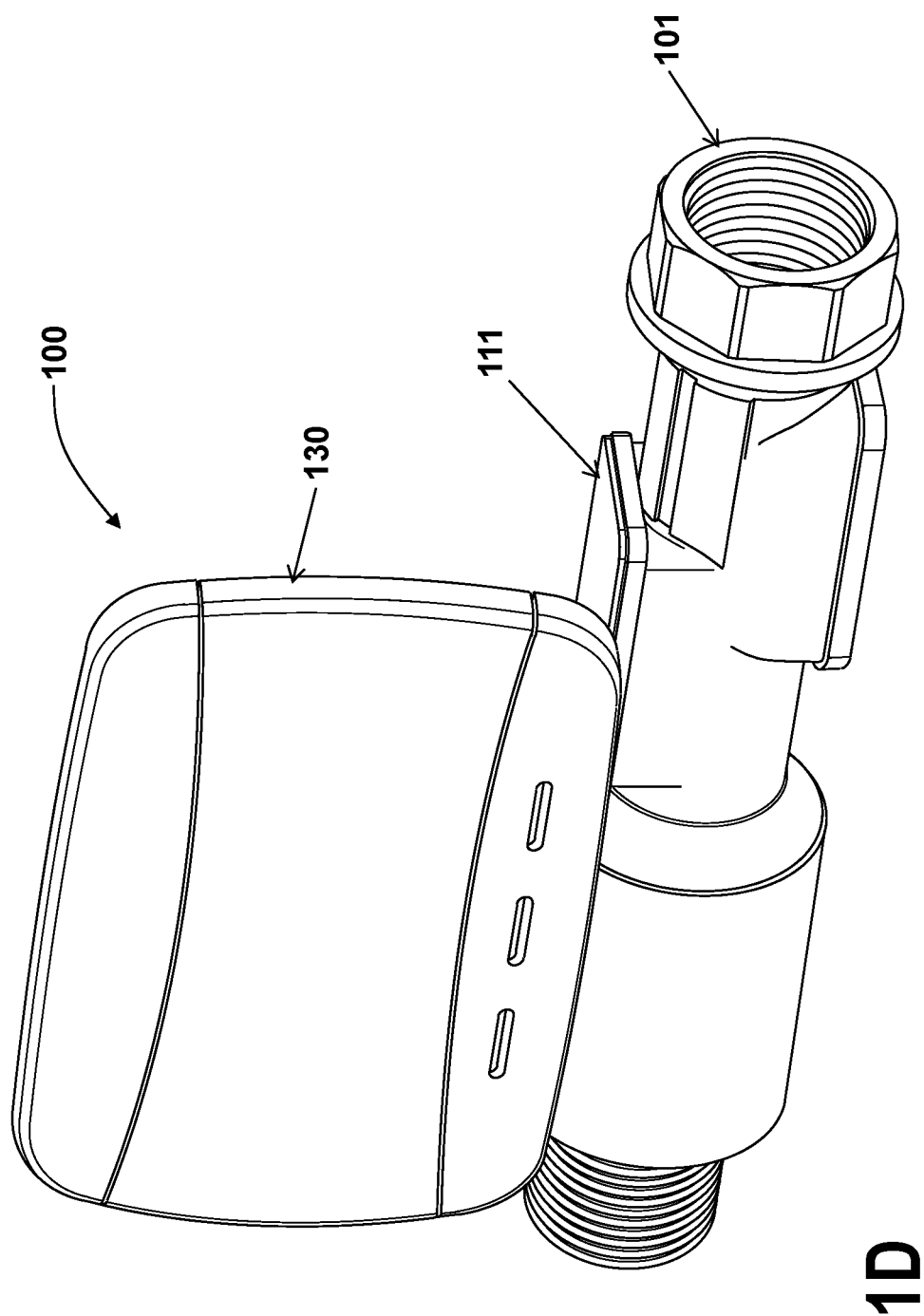

FIGS. 1A-1D show multiple diagrams depicting a fluid flow monitoring system 100 integrating an ultrasonic fluid flow meter and a shut-off valve. The ultrasonic fluid flow meter includes a pair of ultrasonic transducers. FIG. 1A shows a longitudinal cross-section view and a top view of the fluid flow monitoring system 100. FIG. 1B shows a front view and right-side view of the fluid flow monitoring system 100. FIG. 1C shows a rear view of the fluid flow monitoring system 100. FIG. 1D shows a pictorial drawing of the fluid flow monitoring system 100. The fluid flow monitoring system 100 includes a transducer housing 110 for holding the ultrasonic transducers, a shut-off valve 120 (such as a motorized ball valve), and a control panel 130. The shut-off valve 120 can be placed within the tailpiece (also referred to as pipe fitting) 101, whereas the transducer housing 110 can be sealed in one or more openings of the tailpiece 101 using an O-ring 112. A retainer plate 111 can be used to hold the housing 110 to the tailpiece 101. The retainer plate 111 can be mounted (or connected) to the tailpiece 101 through one or more screws 113. In general, components of the fluid flow monitoring system 100 can be connected to the tailpiece 101 through screw fittings or compression fittings. The tailpiece 101 is capable of being connected to the head of a supply line (or pipe).

The motorized ball valve is an open ball valve capable of being rotated. When the opening of the valve is aligned with the longitudinal axis of the tailpiece 101 (or lumen), maximum fluid flow through the shut-off valve 120 can be achieved. When the valve is rotated at an angle such that the opening of the valve is aligned to be perpendicular to the longitudinal axis of the tailpiece 101 (or lumen), the fluid flow is shut off through the valve. In some implementations, the fluid flow monitoring system 100 can employ a solenoid-based valve or another type of valve known in the art.

In some implementations, the transducers can be mounted according to a "Z" configuration such that. In a Z configuration, the transducers are arranged across each other with respect to the lumen (or tailpiece 101), such that a direct (i.e., no reflection from the inner wall of the lumen) signal path between the transducers is at an angle, greater than zero and smaller than 90 degrees, with respect to the longitudinal axis of the lumen. In some implementations, the angle can be around 45 degrees (e.g., between 35 and 55 degrees, between 30 and 60 degrees or other range around 45 degrees). In some implementations, the ultrasonic fluid meter can include invasive (or non-invasive) transducers that can be arranged according to "V", "W", or "M" configurations. In a "V" configuration, the transducers are arranged at a distance apart from each other and the signal path between the transducers involves one reflection from the inner wall of the lumen. In some implementations, different configurations can be associated with different paths of ultrasonic signals propagating between the transducers. In any of these configurations, the transducers of the ultrasonic fluid meter are arranged such that the fluid flow rate measured by the ultrasonic fluid meter is indicative (or reflects) the fluid flow rate through the shut-off valve 120.

The fluid flow monitoring system 100 can also include a control board 130 configured to control both the ultrasonic fluid meter and the shut-off valve 120. The control panel 130 can include a controller (not shown in FIGS. 1A-1D), such as a microprocessor, microchip, digital signal processor (DSP), application-specific integrated circuit (ASIC), an analog circuit or a combination thereof, embedded therein and configured to receive measured signals from the ultrasonic fluid meter, check for fluid leak events based on the measured signals, and automatically actuate the shut-off valve 120 to stop fluid flow through the tailpiece 101 upon detecting a fluid leak event. For instance, the controller can obtain measured ultrasonic signals (or samples thereof) received at the transducers, for example, through wired or wireless connection, and estimate the fluid flow velocity based on the measured signals. The controller can then check for fluid leak events based on the estimates of fluid flow velocity and actuate the shut-off valve 120 (e.g., through an output electric signal) to shut off fluid flow through the tailpiece 101 if a leak event is detected. The ultrasonic fluid meter and the shut-off valve 120 can share a single control system, for example, running on a single microcontroller configured to compute fluid flow parameters based on measured signal(s) by the fluid flow meter, detect fluid leak events and actuate the shut-off valve 120 upon detection of leak events. In some implementations, the control system can include more than one control circuit (e.g., more than one microprocessor, more than one microcontroller, or a combination thereof) communicatively coupled to each other. For instance, the control system can include a microprocessor configured to compute estimates of a fluid flow parameter, such as fluid flow velocity or fluid flow rate and detect fluid leak events based on the estimates of the fluid flow parameter, and a microcontroller coupled to the microprocessor configured to actuate the shut-off valve 120 upon receiving an indication of a leak event.

In some implementations, the control panel 130 can be mounted on the tailpiece 101. The control panel 130 can be capable of being rotated to face different directions. In some implementations, the control panel 130 can be mounted on a wall or other structure or object. In such implementations, the control panel 130 can be coupled to the transducers or the shut-off valve 120 through wired or wireless connections. The shut-off valve 120 can be an electro-mechanical valve capable of being controlled by the controller. The control panel 130 can include (or be coupled to) an input interface (such as buttons) allowing manual interaction with the control panel 130. The control panel 130 can include (or be coupled to) a display 135 for displaying information. In some implementations, the display 135 can be a touch screen allowing user interaction with the control panel 130. In some implementations, the control panel 130 can simply include a controller (and or circuitry) and a housing (or a fitting component) thereof.

In some implementations, the tailpiece 101 can be a component of the fluid flow monitoring system 100. That is, the fluid flow monitoring system 100 can include the tailpiece 101 together with the transducers, the transducer housing 110, the shut-off valve 120, the controller and any fitting components (such as the retainer plate 111, the O-ring 112, screws 113 or a combination thereof) to mount the transducers, the transducer housing 110 or the shut-off valve 120 to the tailpiece 101. In some implementations, the fluid flow monitoring system 100 can be assembled into a single device. In some implementations, the fluid flow monitoring system 100 can be assembled into multiple devices communicatively coupled to each other. For instance, the control panel 130 can be mechanically detached from the tailpiece 101.

In some implementations, the fluid flow monitoring system 100 can be implemented based on a modular architecture such that the ultrasonic fluid flow meter and the shut-off valve 120 are configured to operate independently. In such implementations, the ultrasonic fluid flow meter and the shut-off valve 120 can be communicatively coupled to each other through wired (or wireless) connections. The ultrasonic fluid flow meter, in such implementations, can have a respective controller (or electric circuit) for processing ultrasonic signals, computing total accumulation, detecting leaks and communicating with the shut-off valve 120. The shut-off valve 120 can also include respective control circuit(s), such as a microchip, microprocessor or microcontroller, to electronically drive the shut-off valve 120 and communicate with the ultrasonic fluid flow meter. Upon detecting a fluid leak event, the ultrasonic fluid flow meter can communicate an indication of the leak event to the shut-off valve 120 through a wired connection or wireless (such as Wi-Fi, Bluetooth or Zig bee) connection.

Figure 2A:
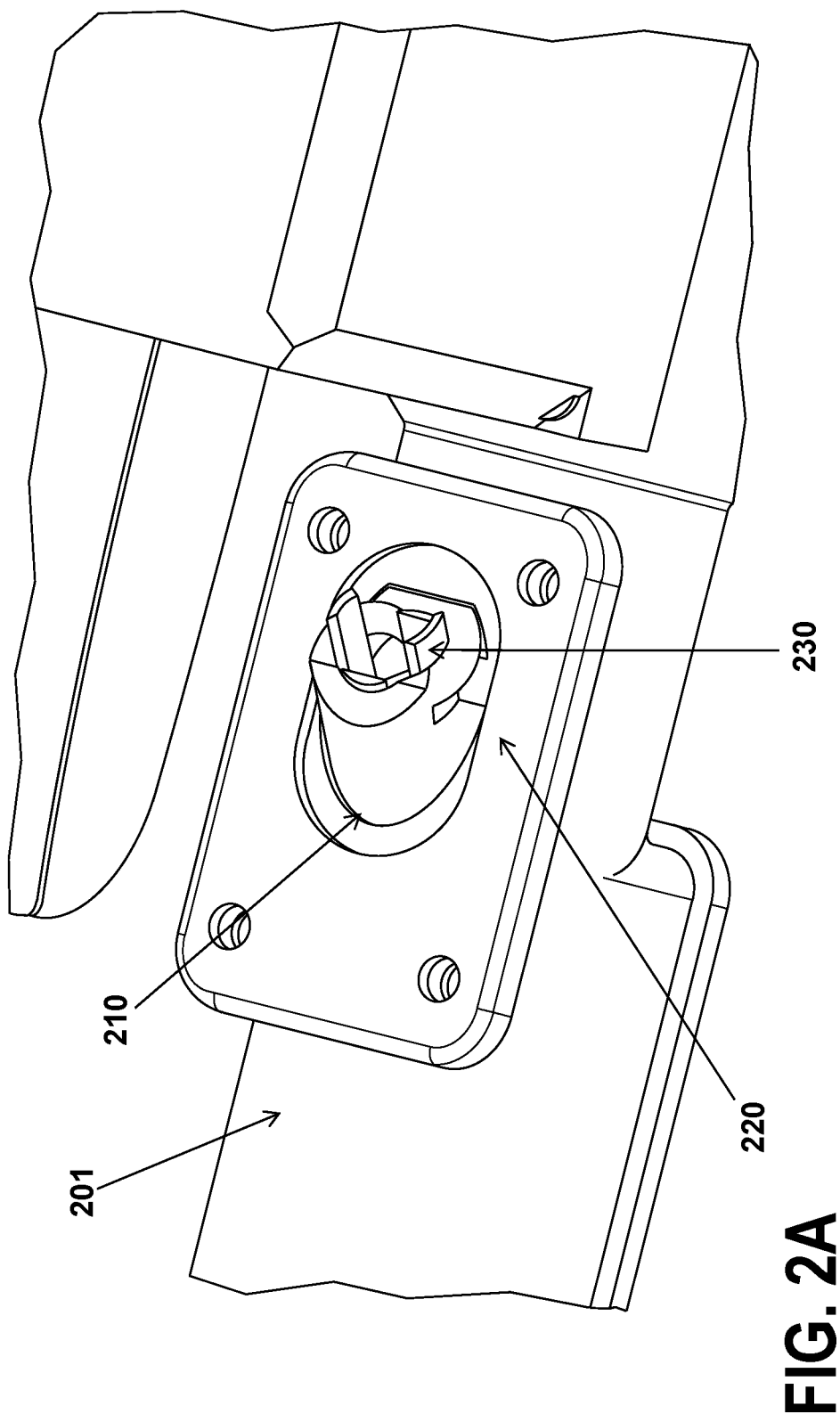
Figure 2B:
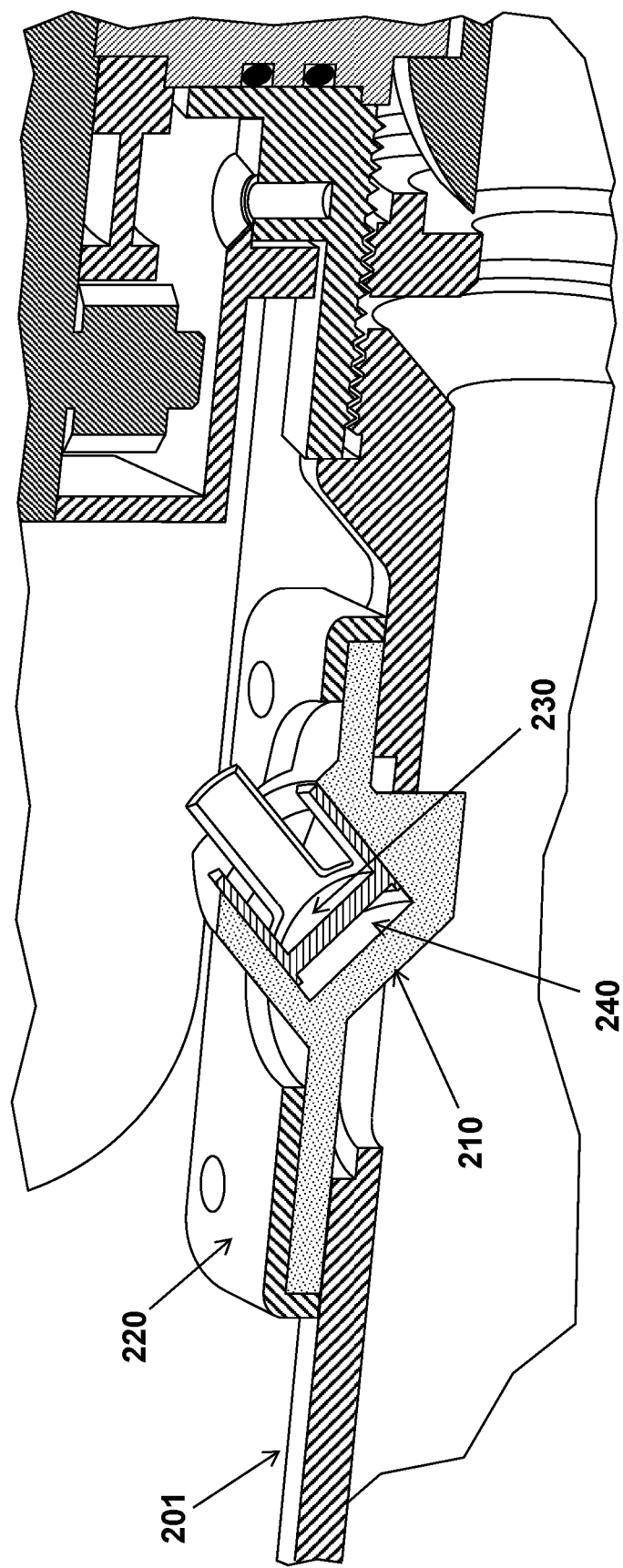

FIGS. 2A-2C show diagrams illustrating a mechanism for mounting transducers 240 into a lumen structure. The transducers 240 can be two thin-film or disk piezoelectric transducers. Each transducer 240 can be mounted to the tailpiece 201 through a respective transducer holder (or housing) 210. A transducer holder 210 can be placed through an opening (or a groove) in the wall of the lumen structure or the wall of the tailpiece 201. The transducer holder 210 can be sealed to the tailpiece 201 using an O-ring, a retainer plate 220 or a combination thereof. The retainer plate 220 can be made, for example, of stamped stainless steel and can be employed to hold the transducer holder 210 in place against fluid pressure. The retainer plate 220 can be screwed into the tailpiece 201 (or the lumen structure in general). Each transducer 240 can be placed into a respective transducer holder 210 through a respective clip 230 capable of snapping on and holding the transducer 240. Each clip 230 can be pushed (e.g., by applying a mechanical force) into the transducer holder 210. Each clip 230 can include at least two tabs 235 capable of bending (e.g., at an angle with respect to a reference vertical position) toward each other when a mechanical force is exerted on both tabs 235. The outside wall of at least one of the tabs 235 (or the outside wall of the clip 230) can include a protrusion 236 (e.g., a bump structure). When the clip 230 is pushed into the transducer holder 210, the protrusion(s) 236 moves into respective opening(s) (or groove(s)) 216 associated with the transducer holder 210, therefore, locking the clip 230 into the transducer holder 210.

In order to mount the transducer 240 into a respective transducer holder 210, a user can place the transducer 240 into the clip 230 and push, by applying a mechanical force, the assembly of the clip 230 and the transducer 240 into the transducer holder 210. The user can apply an amount of grease, such as lithium grease, to the face of the transducer 240 before pushing the assembly of the clip 230 and the transducer 240 into the transducer holder 210. In order to remove the transducer 240, the user can squeeze the tabs of the clip 230 toward each other and pull the clip 230. Pushing the tabs 235 towards each other can cause the protrusion(s) 236 to move out of the respective openings (or grooves) 216 therefore allowing the clip to be pulled out of the transducer holder 210. The assembly mechanism illustrated in FIGS. 2A-2C allows removal and replacement of the transducer 240 without disturbing or interrupting the fluid flow. Since the clip 230 is not in the fluid path, it can be removed (together with the transducer 240) without interfering with the fluid path. The assembly of the clip 230 and the transducer 240 can be removed from the transducer holder 210 while keeping the transducer holder 210 sealed to the tailpiece 201 (or the lumen structure). Accordingly, the transduces 240 can be easily removed (e.g., for replacement or cleaning) and put back into the fluid flow monitoring system 100 without de-assembling the transducer holder 210 or de-coupling the tailpiece 201 from the fluid flow distribution system.

The mounting mechanism shown in FIGS. 2A-2C can be employed in a fluid flow monitoring system 100 or in a fluid flow meter (e.g., not necessarily integrated with a shut-off valve). As described in further detail below, the system employing the mounting mechanism shown in FIGS. 2A-2C can further include an in-line leak detector for detecting flow and no-flow states, a pressure regulating device for detecting fluid pressure, a check valve for preventing (or at least mitigating) reversal fluid flow, or a combination thereof.

Figure 3:
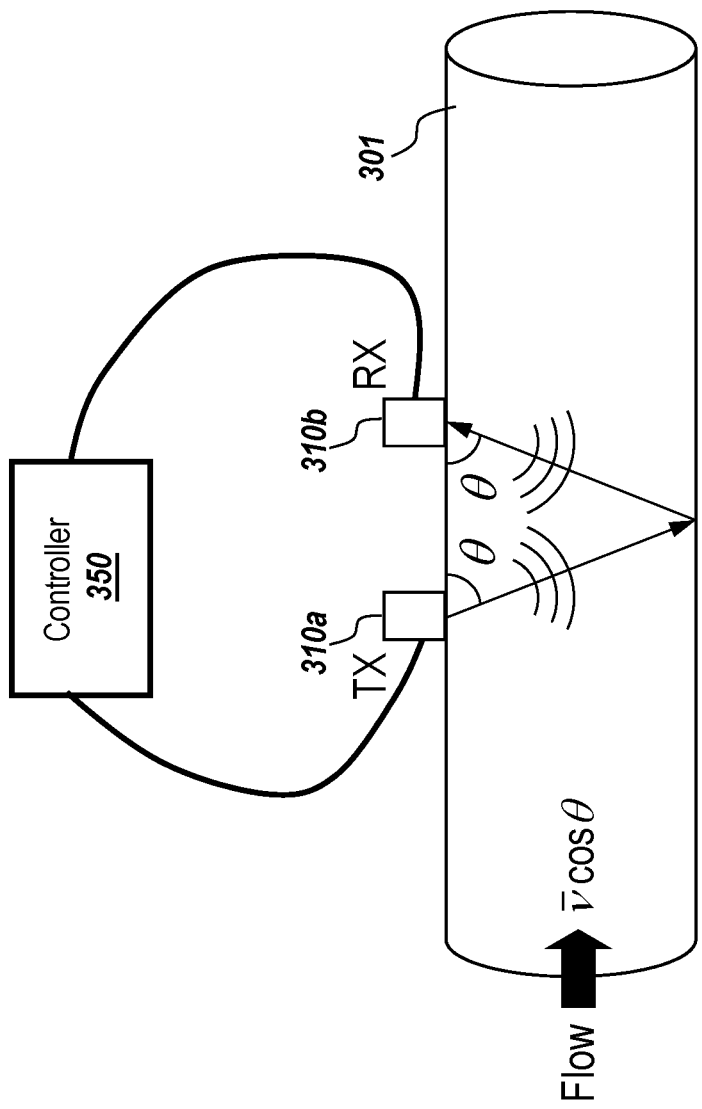
FIG. 3 shows a diagram illustrating ultrasonic signal propagation between ultrasonic transducers of a fluid meter.

FIG. 3 shows a diagram illustrating ultrasonic signal propagation between ultrasonic transducers of a fluid meter. The fluid meter includes a pair of transducers 310a and 310b (also referred to hereinafter as transducer(s) 310) mounted in a non-invasive or invasive manner to the wall of a lumen 301 (such as the tailpiece 101 or 201 or a pipe). The transducers 310 can be coupled to a controller 350. The controller 350 can be a microprocessor, microcontroller, microchip, application-specific integrated circuit (ASIC), digital signal processor (DSP), specialized analog circuit or a combination thereof. The controller 350 can be part of or coupled to the fluid meter. The controller 350 can be configured to access signals transmitted or received by the transducers 310 and compute fluid flow parameter values based on the signals.

Each transducer 310 can be oriented at an angle $\theta$ with respect to the tailpiece longitudinal axis. The configuration (e.g., the orientation and the relative placement with respect to the wall of the lumen) of the transducers 310 can define the propagation direction of ultrasonic signals transmitted or received by the transducers 310. For instance, an ultrasonic signal transmitted by the transducer 310a can propagate at the same direction (e.g., at an angle $\theta$ with respect to the tailpiece longitudinal axis) as the orientation of the transducer 310a, reflect back from the inside of the wall of the lumen (or tailpiece) 301 and be received by the transducer 310b at a direction defined by the orientation of the transducer 310b. In an M or W configuration, an ultrasonic signal transmitted by a first transducer 310 can exhibit three reflections off the wall of the lumen (or tailpiece) 301 before reaching the second transducer 310b. In some implementations, the transducers 310 can be arranged across each other such that the ultrasonic signals propagate directly (without wall reflections) from one transducer 310 to the other. In some implementations, each of the transducers 310 can be configured to operate alternately as a transmitter and receiver. In some implementations, one of the transducers 310 can be configured to operate as a dedicated transmitter, while the other transducer 310 can be configured to operate as a dedicated receiver.

A transmit (TX) transducer (e.g., transducer 310a) can transmit a high-frequency burst, or pulse, into the tailpiece 301 and a receive (RX) transducer (e.g., transducer 310b) can receive a version of the pulse after some time delay (with respect to transmit time). The time delay between the transmit time (e.g., time at which transmission of the pulse starts) and the receive time (time at which reception by the RX transducer starts) represents the propagation time of the transmitted signal between the TX and RX transducers 310. The signal propagation time depends on the fluid flow velocity. For instance, the propagation time of a signal propagating upstream (against fluid flow) is longer than the propagation time of a signal propagating in no-flow fluid. Also, the propagation time of a signal propagating downstream (along fluid flow) is shorter than the propagation time of a signal propagating in no-flow fluid.

In some implementations, the increase in signal propagation time (for instance with respect to signal propagation time in a no-flow state) due to fluid flow velocity can be linearly proportional to the velocity of the fluid. For water flowing within pipes, such linearity is satisfied at least for a range of flow rates such as from about 0 gallons per minute (GPM) to about 1 GPM, about ¼ GPM, about ½ GPM, about ¾ GPM or other flow rate value. As such, fluid flow velocity can be computed based on measured signal propagation times. Also, given that flow rate is linearly proportional to the flow velocity and the cross sectional area of the lumen 301 (e.g., tailpiece 101 or 201 or pipe), the fluid flow rate can be computed based on respective measured signal propagation time(s). In some implementations, the controller 350 can determine the fluid flow rate (or fluid flow velocity) based on measured signal propagation time using a lookup table (LUT). Using a LUT can allow for determination of the fluid flow rate based on measured signal propagation time even if the relationship between the increase in signal propagation time (due to fluid flow) and the flow rate is nonlinear.

In some implementations, the controller 350 can determine the signal propagation time based on cross-correlation values between the RX signal (or samples thereof) and delayed versions of a waveform representing the TX signal. For instance, the controller 350 can determine the signal propagation time to be equal to the time delay of the delayed version of the transmitted waveform associated with the maximum cross-correlation value. In some implementations, the controller 350 can determine the signal propagation time based on cross-correlation values between the RX signal (or samples thereof) and a plurality of templates such that each template corresponds to a respective value of the signal propagation time. The templates can be representations of delayed and/or filtered versions of the waveform. For instance, in generating the templates, the waveform can be filtered in a way to reflect potential distortions (caused by the fluid, the transducers, the tailpiece or a combination thereof) associated with the RX signal. In some implementations, a plurality of filters may employed such that a separate filter is used to generate a respective subset of templates. In some implementations, the controller 350 can determine the signal propagation time by measuring the time difference between transmit time and the time at which the RX signal crosses a pre-determined threshold value at the receiving transducer (e.g., transducer 310*b*). The controller 350 can also determine the signal propagation time by measuring the difference in phase, or phase delay, between the transmitted and received signals.

The controller 350 can compute the fluid flow velocity or fluid flow rate using the difference in signal propagation times associated with a signal transmitted upstream and a signal transmitted downstream. In such case, each of the transducers 310 can be configured to operate alternately as transmitter and receiver. The controller 350 can also compute the fluid flow velocity or fluid flow rate using the difference in signal propagation times associated with a signal transmitted upstream (or downstream) and a signal transmitted in a no-flow fluid state. In some implementations, both time differences are linearly proportional to the fluid flow velocity and fluid flow rate. The controller 350 can determine the difference in signal propagation times associated with upstream and downstream signals (or upstream and zero-flow signals or downstream and zero-flow signals) by computing cross-correlation values between respective upstream and downstream RX signals. In some implementations, the controller 350 can determine the difference in signal propagation times associated with upstream and downstream signals (or upstream and zero-flow signals or downstream and zero-flow signals) by computing difference in phase between such signals in the frequency domain.

In some implementations, the ultrasonic fluid meter can include (or be coupled to) an analog-to-digital converter configured to sample received ultrasonic signals. A processor (such as a DSP) can then process the sampled signals to determine fluid flow velocity or fluid flow rate. In determining the fluid flow velocity or fluid flow rate, the processor can be configured to perform filtering, cross-correlation, zero-crossing, phase-based methods based on FFT or Goertzel algorithm, template matching or a combination thereof. In some implementations, the ultrasonic fluid flow meter can include a custom application specific integrated circuit (ASIC) configured to perform the zero-crossing or phase detection techniques for differential time-of-arrival estimation directly.

The fluid flow monitoring system 100 can include a fluid flow meter such as the fluid meter shown in FIG. 3 and a shut-off valve 120. The transducers 310*a* and 310*b* can be mounted into the transducer housing 110 according to the mechanism described in FIGS. 2A-2C. Other invasive or non-invasive settings can be used to mount the transducers 310 into/onto the tailpiece 301. The controller 350 can be embedded in a casing associated with the control panel 130. The fluid flow monitoring system 100 can further include temperature sensors, such as thermistors, embedded directly in the tailpiece 301. In some implementations, temperature sensors interfacing with the outside of the tailpiece 301 or the outside of the supply line (or pipe) can also be employed. The controller 350 can obtain data from such sensors for use to compensate for the variability in the speed of sound in the fluid due to change in temperature or changes in the electrical properties of the transducers 310 or any other electrical components.

The fluid flow monitoring system 100 is capable of detecting fluid leak events and actuating the shut-off valve 120 upon detecting a leak event. Challenges associated with reliable detection of leak events can include fluid flow parameter estimation error and distinguishing a fluid flow associated with a leak event from a fluid flow associated with a normal usage of the fluid. For instance, reliable leak detection in a water distribution system of a building involves distinguishing between water flow driven by a fixture or an appliance in the building from a water flow resulting from a leak.

Figure 4:
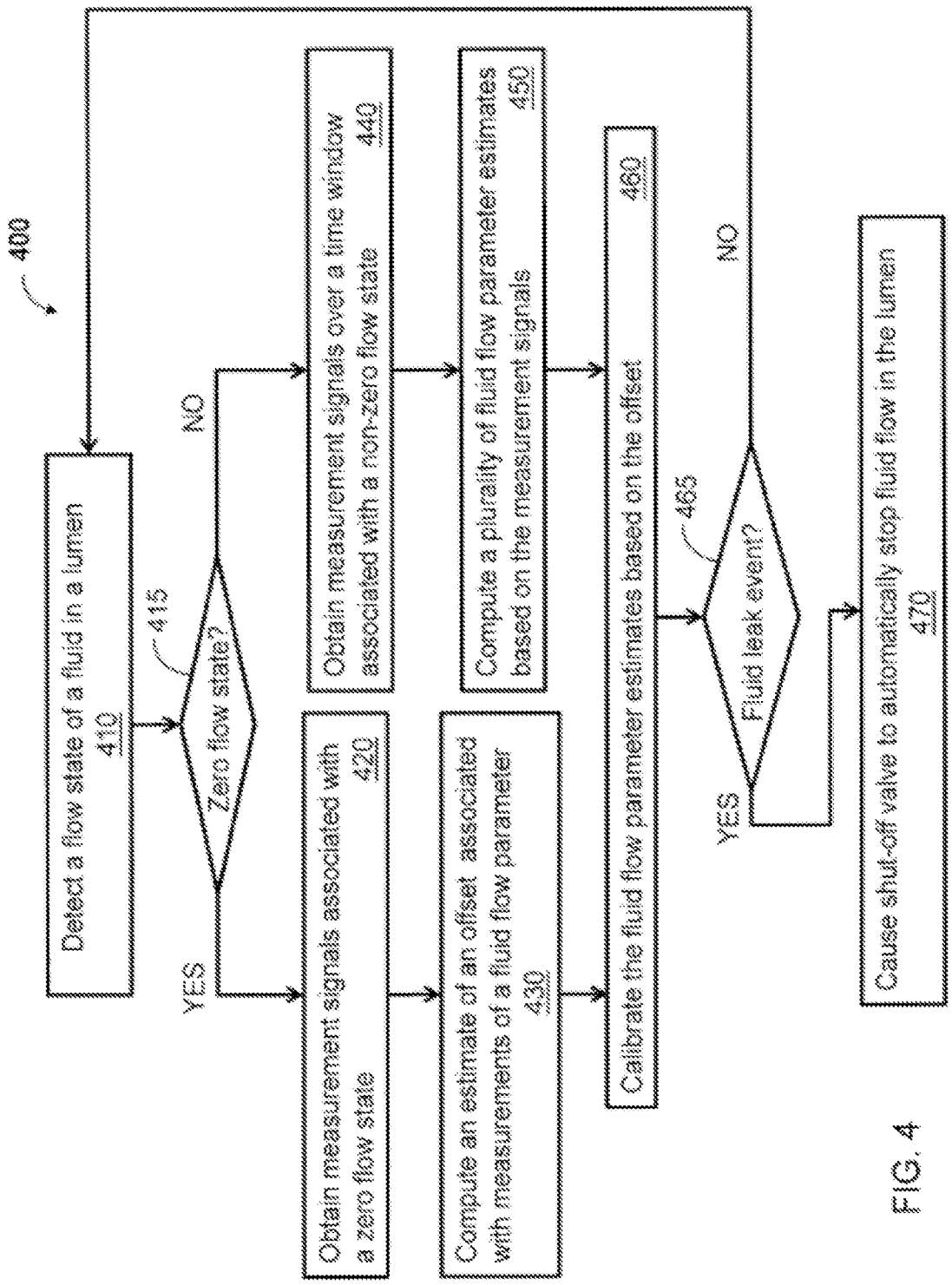
FIG. 4 is a flowchart illustrating a method of monitoring fluid leak events employing an inline leak detector.

FIG. 4 is a flowchart illustrating a method 400 of monitoring fluid leak events employing an inline leak detector. The method 400 includes detecting a flow state of a fluid in a lumen (step 410), if the detected flow state is indicative of a zero flow state (decision block 415) obtaining a plurality of measurement signals associated with the zero flow state (step 420) and computing an estimate of an offset associated with a fluid flow parameter based on the measurement signals associated with the zero flow state (step 430), if the detected flow state is indicative of a non-zero flow state (decision block 415), obtaining a plurality of measurement signals over a time window associated with the non-zero flow state (step 440) and computing a plurality of fluid flow parameter estimates based on the measurement signals obtained over the time window (step 450). The method 400 also includes calibrating the fluid flow parameter estimates based on the estimate of the offset (step 460), checking for presence of a fluid leak event based on the calibrated fluid flow parameter estimates (decision block 465), and actuating a shut-off valve to stop fluid flow upon detecting a leak event (step 470). The method 400 includes iterating back to step 410 if no fluid leak event is detected at decision block 465.

Referring to FIGS. 1A-1D, 3 and 4, the method 400 can be performed by the fluid flow monitoring system 100. Specifically, a controller associated with the flow monitoring system 100, such as controller 350, can obtain an indication of a fluid flow state from an inline leak detector (step 410). In some implementations, the fluid flow monitoring system 100 can include an inline leak detector for detecting fluid flow states. The inline leak detector can be an impeller-based inline fluid flow meter or any other fluid flow meter. In some implementations, the inline leak detector (or a control circuit thereof) can send respective measurements of the fluid flow rate to the controller 350. In some implementations, the inline leak detector (or a control circuit thereof) can send a flag (e.g., a 1-bit) indicative of the fluid flow sate (i.e., zero or non-zero fluid flow state) to the controller 350. Inline leak detectors tend to accurately measure relatively small fluid flow rates (such as flow rates less than or equal to 0.1, 0.2 or 0.3 GPM), but can have poor accuracy in measuring higher flow rates (such as flow rates larger than 0.1, 0.2 or 0.3 GPM). As such, the inline leak detectors can be used by the controller 350 to detect fluid flow states (i.e., zero or non-zero flow states) of the fluid in the tailpiece 101. Since the ultrasonic fluid flow meter can exhibit measurement offsets (e.g., due to a change in fluid temperature or a change in electrical properties of the transducers 310 or other electrical components of the fluid flow monitoring system 100), fluid flow rate (or fluid flow velocity) measurements by the inline leak detector can provide a more accurate detection of fluid flow states.

The inline leak detector can be arranged ahead of the ultrasonic meter (in the direction of the fluid flow), and the ultrasonic meter can be arranged ahead of the shut-off valve 120 within the tailpiece 101 (or a lumen). That is, fluid flow moving towards a fluid distribution system would pass by the inline leak detector first, the flow meter second, and the shut-off valve 120 third. In some implementations, the inline leak detector, the flow meter and the shut-off valve 120 can be arranged according to a different order with respect to the direction of the fluid flow.

The controller 350 can determine the fluid flow state based on the indication received from the inline leak detector (decision block 415). For instance, the controller 350 can check measurement values obtained from the inline leak detector (e.g., by comparing to a threshold value) to determine whether the fluid is at a zero flow state or a non-zero flow state. If the indication obtained from the inline leak detector includes a flag indicative of the fluid flow state, the controller 350 can determine the fluid flow state upon reading the flag value.

Upon detecting a zero flow state (at decision block 415), the controller 350 can obtain at least one measurement signal from the ultrasonic fluid flow meter associated with the zero flow state (step 420). For instance, in response to detection of a zero flow state, the controller 350 can cause the transducers to transmit one or more ultrasonic TX signals and receive one or more respective RX ultrasonic signals. The measurement signal(s) can be associated with received RX ultrasonic signals. For instances, the measurement signals can include samples of ultrasonic RX signals received at the transducer(s) 310.

The controller 350 can then compute an estimate of an offset associated with measurements of a fluid flow parameter based on the measurement signal(s) associated with the zero flow state (step 430). The offset estimate can be representative of one or more measurements of the fluid flow parameter measured by the fluid flow meter during the zero flow state. The controller 350 can compute a number of fluid flow parameter values (such as fluid flow rate values or fluid flow velocity values) based on a respective number of measurement signals obtained from the fluid flow meter during the zero flow state, and compute the estimate of the offset as an average of the of computed fluid flow parameter values. For instance, the controller 350 can compute estimates of fluid flow rate (or fluid flow velocity) using cross-correlation values between upstream and downstream RX signals, upstream and zero flow RX signals, downstream and zero flow RX signals, or RX signals and maintained waveform (or templates thereof). The controller 350 can compute estimates of fluid flow rate (or fluid flow velocity) using difference in phase between upstream and downstream RX signals, upstream and zero flow RX signals, downstream and zero flow RX signals, or RX signals and a maintained waveform (or templates thereof).

In some implementations, the controller 350 can keep repeatedly checking the fluid flow state (decision block 415) while receiving measurement signals from the fluid flow meter. In some implementations, the controller 350 can employ a minimum number of fluid flow parameter values to compute an estimate of the offset. In such implementations, the controller 350 can use a counter to keep track of the number of computed fluid flow parameter values while signals obtained from the inline leak detector continuously indicate a zero flow state. If the inline leak detector signals a switch to a non-zero flow state before the minimum number of computed fluid flow rate values is reached, the controller can discard the computed values.

If the indication of the fluid flow state is indicative of a non-zero fluid flow state (decision block 415), the controller 350 can obtain a plurality of measurement ultrasonic signals from the fluid flow meter over a time window associated with the non-zero fluid flow state (step 440). In some implementations, the controller 350 can periodically trigger the transmit transducer 310a to transmit a TX ultrasonic signal and trigger the receiving transducer 310b to receive a respective RX ultrasonic signal propagating through the fluid in the tailpiece 101. The controller 350 can obtain measurement signals from the receive transducer 310b or a circuit coupled thereto. Each measurement signal can be a representation (such us samples) of a respective signal. For instance, an analog to digital converter (ADC) can be configured to sample RX ultrasonic signals received by the transducer(s). In some implementations, the transmit transducer 310a and the receive transducer 310b can be configured to automatically transmit and receive ultrasonic signals periodically with no trigger from the controller 350. In some implementations, the transducers 310 can be configured to transmit ultrasonic signals upstream and downstream alternately.

The controller 350 can compute a plurality of fluid flow parameter estimates based on the measurement signals obtained over the time window associated with the non-zero flow state (step 450). The controller 350 can determine a signal propagation time (for an ultrasonic signal propagating) between the transmit and receive transducers 310 based on a respective measurement signal. For each pair of measurement signals (e.g., a pair of measurement signals associated with an upstream and a downstream ultrasonic signals), the controller 350 can compute a respective fluid flow rate value (or a fluid flow velocity value) based on the difference between the respective signal propagation times. In particular, the controller 350 can compute the difference between the signal propagation times by computing cross-correlation values between the upstream and downstream RX signals or by computing the difference in phase between the upstream and downstream RX signals in the frequency domain. In some implementations, the controller 350 can compute a fluid flow rate value (or a fluid flow velocity value) for each measurement signal based on the difference in signal propagation time between measurement signals associated with a zero flow RX signals and an upstream RX signal (or a zero flow RX signal and downstream RX signal). In some implementations, the controller 350 can repeat obtaining measurement signals and computing respective fluid flow parameters while the indication(s) obtained from the inline detector over the time window indicate a continuous non-zero fluid flow state. In some implementations, the controller 350 can be configured to repeat obtaining measurement signals and computing estimates of the fluid flow parameter every given time period such as every one minute, every two minutes, every five minutes or every other time period.

The method 400 includes the controller 350 calibrating the computed fluid flow parameter estimates based on the computed estimate of the offset (step 460). The controller 350 can subtract the offset estimate from each of the fluid flow parameter estimates computed at step 450. The resulting calibrated fluid flow parameter estimates represent more accurate estimates of the fluid flow parameter than the estimates computed at step 450.

The method 400 also includes the controller 350 checking for presence of a leak event based on the calibrated fluid flow parameter estimates (decision block 465). The controller 350 can be configured to determine presence of a leak event upon determining that the calibrated fluid flow parameter estimates over the time window are indicative of one or more properties associated with leak events. That is, the controller 350 can detect a leak event (at decision block 465) by checking the calibrated fluid flow parameter estimates for such properties. For instance, the controller 350 can detect a leak event by checking whether computed fluid flow rate values, fluid flow velocities values, or a combination thereof satisfy one or more criteria indicative of leak events.

If no leak event is detected at decision block 465, the controller 350 can loop back to step 410 to obtain more indications of fluid flow states from the inline leak detector. In some implementations, the controller 350 can detect leak events (decision block 465) based on the fluid flow parameter estimates computed at step 450 (i.e., non-calibrated estimates). For instance, the controller 350 can omit the calibration step 460, but instead use only fluid flow parameter estimates (computed in step 450) that are larger than the estimated offset to detect leak events. In some implementations, the controller 350 can use a combination of calibrated and non-calibrated fluid flow parameter estimates to detect leak events at decision block 465.

Figure 5A:
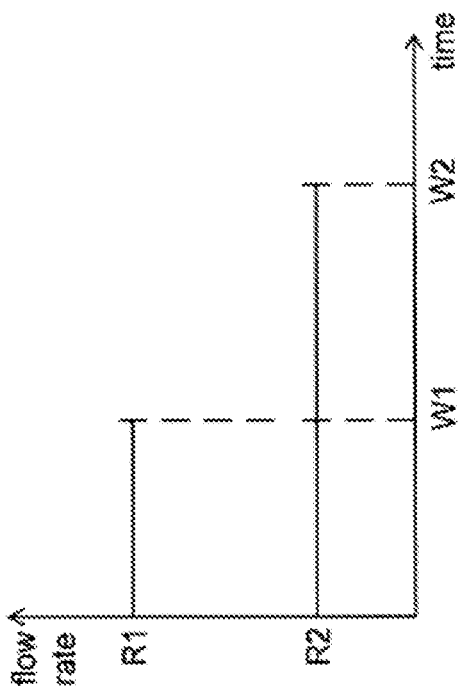
FIGS. 5A and 5B are diagrams illustrating properties for characterizing leak events.
Figure 5B:
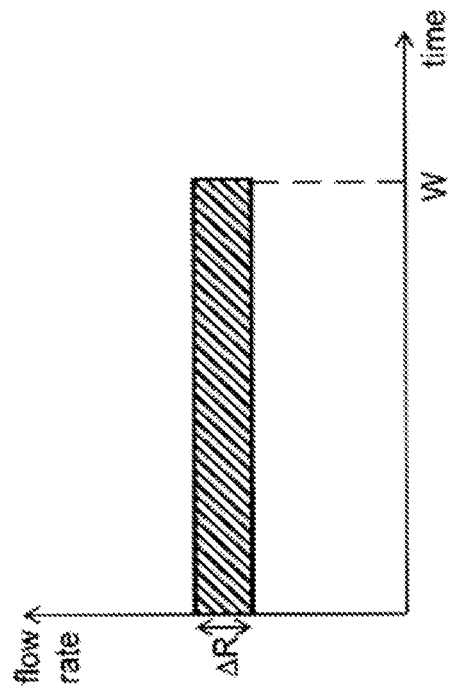

FIGS. 5A and 5B are diagrams illustrating properties for characterizing leak events. Referring to FIG. 5A, a fluid leak event can be defined using two fluid flow rate thresholds R1 and R2 and two respective time windows W1 and W2. That is, the controller 350 can detect a fluid leak event upon detecting a fluid flow having a fluid flow rate exceeding R1 over a time duration greater than or equal to W1, or exceeding R2 over a time duration greater than or equal to W2. In FIG. 5A, the higher the flow rate threshold value is, the shorter is the respective time window and the smaller the flow rate threshold value is, the longer is the respective time window. For instance, R1 can be equal to 20 GPM, W1 can be equal to 30 seconds, R2 can be equal to 0.1 GPM and W2 can be equal to 2 hours. In some implementations, more than (or less than) two flow rate threshold values (and respective time windows) can be used to characterize leak events. Referring back to FIG. 4, the controller 350 can be configured to detect a leak event upon determining that all fluid flow rate estimates associated with the time window W1 exceed the threshold value R1 or upon determining that all fluid flow rate estimates associated with the time window W2 exceed the threshold value R2. In some implementations, the thresholds R1 and R2 can be associated with fluid flow velocity instead of fluid flow rate.

Referring to FIG. 5B, leak events can be characterized as having fluid flow rates (or fluid flow velocities) that are substantially constant (or steady) over a time window W. For instance, a fluid flow with a flow rate (or flow velocity) confined to (or varying within) a range ΔR over a time window W can be indicative of a leak event. The flow rate range ΔR can be equal to 0.01 GPM, 0.02 GPM, 0.03 GPM, 0.04 GPM, 0.05 GPM or other value. In some implementations, a single time window W (such as 10, 15 or minutes) can be used. In some implementations, multiple time windows can be employed. For instance, each time window can be associated with a respective flow rate level or a respective flow rate range. In some implementations, within each flow rate range, leak events can be defined as flow events with a flow rate (or flow velocity) that is substantially constant over the respective time window. Referring back to FIG. 4, the controller 350 can be configured to detect a leak event upon determining that all fluid flow rate estimates measured within the time window W are within the flow rate range ΔR. In some implementations, a fluid velocity range can be employed instead of the flow rate range ΔR.

Figure 5C:
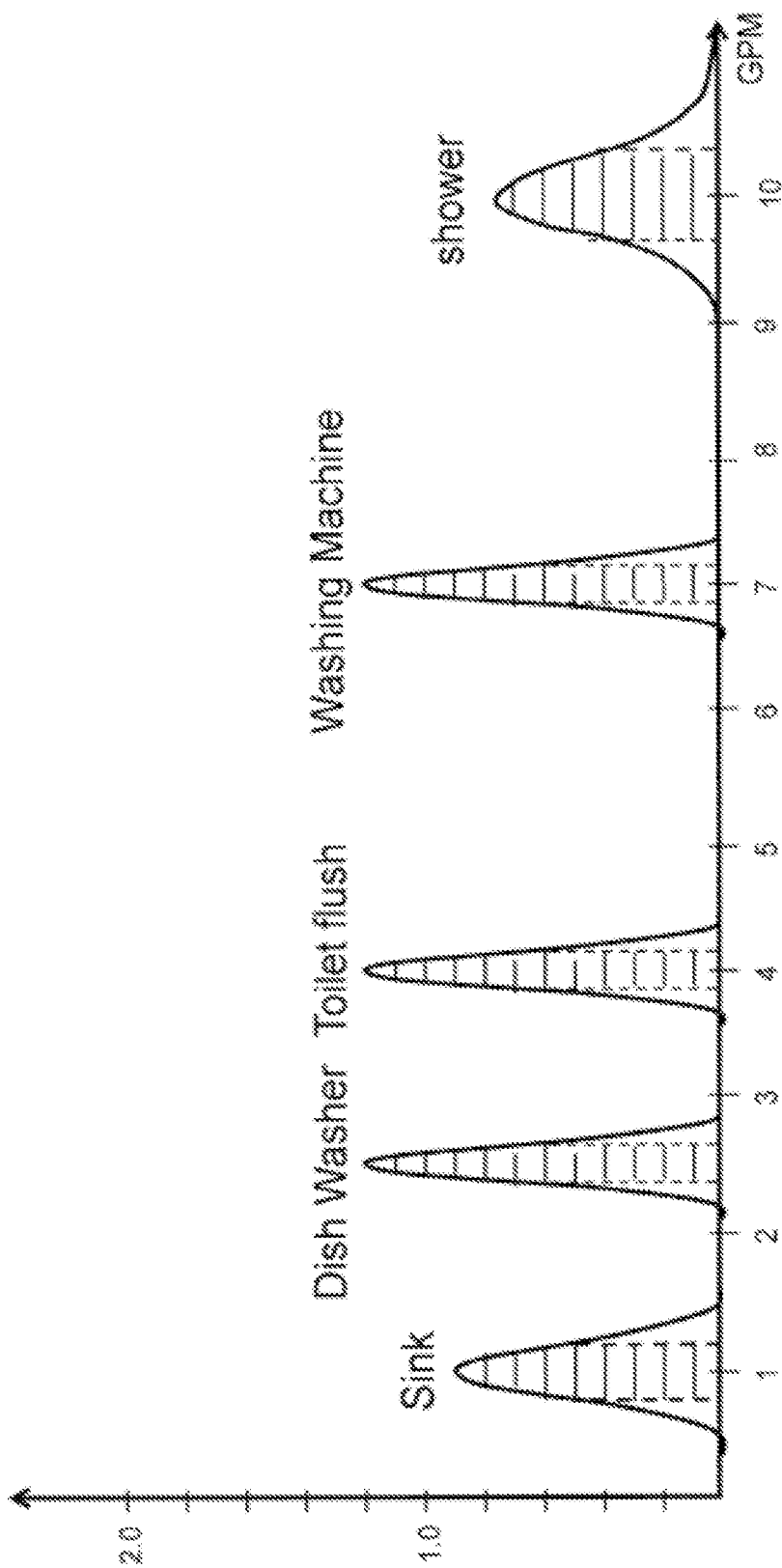
FIG. 5C is a diagram illustrating probability distributions for water flow rates associated with a plurality of fixtures or appliances in a house or building.

FIG. 5C is a diagram illustrating example probability distributions (such as probability density functions) for water flow rates associated with a plurality of fixtures or appliances coupled to a water distribution system in a house or building. Each probability density function represents the probability distribution of water flow rate for a respective apparatus (such as a fixture or appliance) coupled to the water distribution system. In particular, FIG. 5C shows a first probability density function of water flow rate driven solely by a sink, a second probability density function of water flow rate driven solely by a dish washer, a third probability density function of water flow rate driven solely by a washing machine and a fifth probability density function of water flow rate driven solely by a shower faucet. Such probability distributions (e.g., probability density functions) can be constructed based on collected statistical and/or experimental data for different fixtures or appliances. The statistical data can be collected through experimentations with distinct fixtures and appliances (or apparatuses in general). In some implementations, statistical data or characteristics of the probability distribution for a particular fixture or appliance can be obtained from a respective manufacturer, vendor or other entity. In some implementations, the probability distributions can be defined in terms of fluid flow velocity instead of flow rate. While the probability distributions shown in FIG. 5C are associated with water flow driven by fixtures or appliances coupled to a water distribution system, similar probability distributions can be employed in association with other fluid distribution systems and apparatuses coupled thereto. In some implementations, the probability distributions of fluid flow parameters (such as fluid flow rate or fluid flow velocity) for distinct apparatuses can be represented using cumulative distribution functions instead of probability density functions.

In some implementations, the controller 350 can employ the probability distributions (such as those shown in FIG. 5C) to detect water flow events driven by any of the respective fixtures, appliances or a combination thereof. That is, given a measured fluid flow rate (or fluid flow velocity), the controller 350 can determine the likelihood of the measured flow rate being driven by a given apparatus (such as a fixture or appliance) based on the fluid flow probability distribution of that apparatus. For instance, considering the probability density functions shown in FIG. 5C, a water flow rate substantially equal to 10 GPM (e.g., a measured water flow rate within the shaded region of the probability density function for the shower) is more likely to be driven by the shower faucet whereas a water flow rate that is substantially equal to 1.0 GPM (e.g., a measured water flow rate within the shaded region of the probability density function for the sink) is more likely driven by the sink faucet. In some implementations, the controller 350 can be configured to determine for each apparatus (such as a fixture or appliance) a respective probability of a measured flow rate being driven by that apparatus. For instance, the controller 350 can use the probability density function value (associated with a probability density function for a given apparatus) corresponding to the measured flow rate to determine the probability of the measured flow rate being driven by the respective apparatus. In some implementations, the controller 350 can be configured to determine for each apparatus a respective flow rate range (such as the shaded regions shown in FIG. 5C for each of the probability density functions). For instance, the controller 350 can define for each apparatus a respective flow rate range with respective probability (i.e., probability of fluid flow rate driven by that apparatus being within the respective flow rate range) equal to 0.95, 0.9, 0.85 or other probability value. The controller 350 can then determine that a measured flow rate is (or is not) driven by a given apparatus based on the respective flow rate range. The controller 350 can then check whether a measured fluid flow rate is within a flow rate range of a given apparatus to determine whether or not the measured flow rate is driven by that apparatus. That is, the controller 350 can determine a measured fluid flow rate to be driven by a given apparatus if the measured fluid flow rate falls with the fluid flow rate associated with that apparatus.

A measured fluid flow rate can be driven by multiple apparatuses. For instance, a measured water flow rate can be driven by a sink faucet and a shower faucet that are running simultaneously. In order to consider and address fluid flow events driven by a plurality of apparatuses (such as fixtures and appliances), the controller 350 can generate (or obtain) probability distributions for fluid flow rates driven by a combination of apparatuses. For example, defining the random variables $X_1, X_2, \ldots, X_n$ as the fluid flow rates associated with n respective apparatuses $A_1, A_2, \ldots, A_n$, the probability density function for the random variable $X_1 + X_2 + \ldots + X_n$ (i.e., a flow rate driven by the apparatuses $A_1, A_2, \ldots, A_{n-1}$ and $A_n$ simultaneously) is equal to the convolution of the probability density functions for $X_1, X_2, \ldots, X_{n-1}$ and $X_n$ (assuming that the random variables $X_1 + X_2 + \ldots + X_n$ are independent random variables). That is, the probability density function of the fluid flow rate driven by a combination of apparatuses $A_1, A_2, \ldots, A_{n-1}$ and $A_n$ simultaneously is equal to the convolution of the probability density functions of the fluid flow rates driven by each of the apparatuses $A_1, A_2, \ldots, A_{n-1}$ and $A_n$ separately.

Figure 5D:
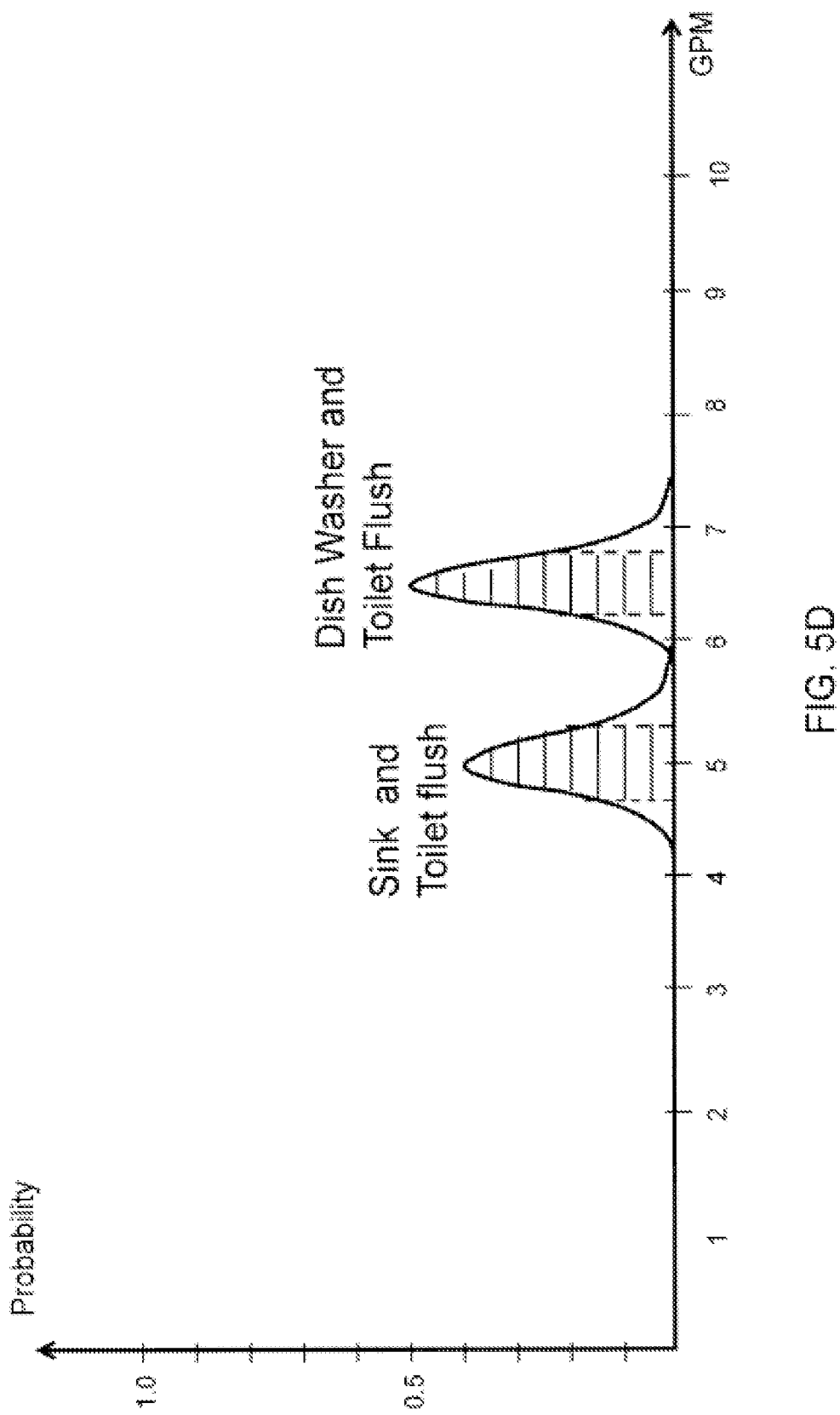
FIG. 5D shows example probability density functions for fluid flow rates each driven by a respective combinations of apparatuses.

FIG. 5D shows example probability density functions for fluid flow rates each driven by a respective combinations of apparatuses. In particular, FIG. 5D shows a first probability density function of fluid flow rate driven by the sink and the toilet flush and a second probability density function of fluid flow rate driven by the dish washer and the toilet flush. Given a number of apparatuses (such as fixtures and/or appliances) coupled to the water distribution system (or a fluid distribution system in general), the controller 350 can employ probability density functions of fluid flow rates associated with each single apparatus coupled to the fluid distribution system to determine whether a measured fluid flow rate is driven by any of the apparatuses coupled to the fluid distribution system. The controller 350 can also employ probability density functions for fluid flow rates associated with (i.e., driven by) respective combinations of apparatuses to determine whether or not a measured fluid flow rate is likely driven by one of the combinations of apparatuses. While FIG. 5D shows probability density functions for two combinations of apparatuses (e.g., sink with toilet flush and dish washer with toilet flush), the controller 350 can employ, for each possible combination of apparatuses (among the apparatuses coupled to the fluid distribution system), the respective probability density function of the fluid flow rate driven by that combination to determine whether or not a measured fluid flow rate is likely driven by that combination of apparatuses. In some implementations, as described above with respect to probability distributions for each fluid flow rate driven by a respective single apparatus, the controller 350 can use a probability density function of a fluid flow rate associated with a combination of apparatuses to determine a probability for a measured fluid flow rate to be driven by that combination of apparatuses.

In some implementations, the controller 350 can employ for each probability density function (corresponding to a flow rate driven by a respective combination of apparatuses) a respective water flow rate range (as shown through the shaded regions in FIG. 5D) to determine whether or not a measured water flow rate is driven by that combination of apparatuses. For instance, the controller 350 can define for each combination of apparatuses a respective flow rate range with respective probability (i.e., probability of water flow rate driven by that combination of apparatuses being within the respective flow rate range) equal to 0.95, 0.9, 0.85 or other probability value. In some implementations, the controller 350 can be configured to determine the flow ranges for separate apparatuses and separate combinations of apparatuses based on a detection model. The controller 350 can be configured to determine a measured water flow rate falling within a flow rate range associated with a combination of apparatuses as a flow rate driven by that combination of apparatuses.

Referring back to FIG. 4, the controller 350 can be configured to detect a fluid leak event (decision block 465) based on probability distributions (such as probability density functions or characteristics thereof) of fluid flow rates associated with separate apparatuses and probability distributions (such as probability density functions or characteristics thereof) associated with separate combinations of apparatuses. For instance, given fluid flow parameter estimates associated with a respective time window, the controller 350 can compute a respective average (such as an average flow rate) and determine, for each probability distribution associated with a respective apparatuses or a respective combination of apparatuses, a probability value for the computed average indicative of the probability of the fluid flow event (associated with fluid flow parameter estimates) being driven by the respective apparatus or the respective combination of apparatuses. The controller 350 can then compare the probability values to a threshold value. If all probability values are smaller than the threshold value, then the controller 350 can determine that the fluid flow event is indicative of a fluid leak event. However, if at least one probability value is greater than (or equal to) the threshold value, the controller 350 can determine that the fluid flow event is driven by an apparatus or a combination of apparatuses and therefore no fluid leak event is detected. In some implementations, the controller 350 can employ the fluid flow parameter estimates (such as fluid flow rate estimates), instead of employing a respective average, for performing leak detection at decision block 465 based on the probability distributions associated with separate apparatuses and separate combinations of apparatuses. In some implementations, the controller 350 can employ multiple threshold values (e.g., a respective threshold value for each apparatuses or a combination of apparatuses) instead of a single threshold value.

In some implementations, the controller 350 can determine presence of a leak event whenever the probability value is determined to be smaller than a respective threshold. In some implementations, the controller 350 can determine ranges of the fluid flow parameter indicative of leak events based on the probability density function g(x).

In some implementations, given a measured average flow rate over a time window, the controller 350 can employ the probability distributions for different apparatuses (shown in FIG. 5C) to explore different potential combinations of apparatuses that may be driving the flow event associated with the measured average flow rate. In considering such combinations, the controller 350 can simply use, for each probability distribution (e.g., shown in FIG. 5C), the respective mean to identify the combination that best fits the measured average flow rate. In some implementations, the controller 350 can identify the combination with the least mean square error (MSE) as representative of the most likely combination of fixtures and/or appliances driving the water flow event associated with the measured average flow rate. The controller 350 can further compute a cumulative probability value associated with the identified combination of apparatus flow events based on the probability distributions of the flow rates associated with the respective fixtures (e.g., a product of probability values obtained from separate probability distributions). The controller 350 can compare the cumulative probability value to a threshold value to determine whether the water flow event is indicative of a leak event (e.g., if the cumulative probability value is smaller than the threshold value).

Referring back to FIGS. 1A-1D, 3, 4 and 5A-5C, the controller 350 can detect a fluid leak event (decision block 465) using any of the methods described with respect to FIGS. 5A-5C or a combination thereof. In some implementations, the controller 350 can be configured to detect a leak event upon determining that each of a plurality of flow rate values measured over a time widow W1 (or W2) exceeds a flow rate threshold value R1 (or R2). In some implementations, the controller 350 can be configured to detect a leak event upon determining that fluid flow rate values measured over a time widow W show a steady (or substantially constant) behavior. The controller 350 can determine that the measured flow rate values are substantially constant by computing a mean of the measured flow rate values over the time window W and comparing a deviation of each measured flow rate value from such a mean to a threshold value such as $\Delta R/2=0.005$ GPM, 0.001 GPM, 0.015 GPM, 0.02 GPM or other value.

In some implementations, the controller 350 can be configured to detect a leak event upon determining that a flow event over a time widow W is unlikely to be driven by normal use of the fluid (such as water flow events driven by fixtures and appliances in a house or building). The controller 350 can employ probability distributions for average flow rates associated with separate normal uses to determine whether measured flow rate parameter estimates are indicative of a flow event driven by combination of normal uses (such as a combination of flow events driven by fixtures or appliances) as discussed with respect to FIG. 5C. In some implementations, the controller 350 can use two or more of the methods described with regard to FIGS. 5A-5C in combination to detect leak events. In such cases, the controller 350 can compare the leak detection results associated with distinct methods and use a decision rule to determine the presence/absence of a leak events based on such results. For instance, different weights may be assigned to respective detection results associated with distinct methods.

In some implementations, the controller 350 may further use other information, such as amplitudes or variation in time, associated with normal fluid uses to determine the likelihood of a normal use in contributing to the flow event measured over the time window W. In some implementations, the controller 350 may employ flow models (such as probability distributions of average flow rates or time-domain information) representative of possible leak events in leak event detection.

In some implementations, the controller 350 can employ maximum likelihood (ML) detection, maximum a posteriori probability (MAP) detection or other detection methods known in the art. Specifically, let Y be a vector of any combination of measured data (such as fluid flow measurements and/or other sensor(s) data) and let X be a state vector. In some implementations, the state vector X can be indicative of whether or not a leak event is present (e.g., a binary random variable taking a value of 0 or 1). In some implementations, the state vector X can include multiple random variables such that one of which is indicative of whether or not a leak event is present. The other random variables can be indicative of whether or each of a plurality of devices (such as fixtures and/or appliances) is driving fluid flow (e.g., whether a sink is driving water flow or not, whether a dishwasher is driving water flow or not, etc.). Using training data, historical data, user-feedback data or a combination thereof, a processor (e.g., on a server or computer device) can generate a statistical model such as a ML detector, MAP detector, Gaussian mixture model (GMM), hidden Markov model (HMM), or other statistical model. Generating the statistical model can include estimating the probabilities p(Y|X) for various instances of X and Y. For instance, generating the statistical model can include estimating the probability density function (pdf) (or probability mass function (pmf)) of the conditional random variable Y|X (such as the probability density functions shown in FIGS. 5C and 5D). In some implementations, the statistical model can be a classifier that allows mapping each observation vector Y to a respective device-events vector X. In some implementations, such classifier can be configured to provide a respective probability value p(X|Y) when mapping an instance of the observation random vector Y to the device-events vector X.

If the p(Y|X) are known (e.g., estimated as part of the statistical model) for each possible instance of X, then a processor can employ maximum likelihood (ML) detection (or estimation) to determine which instance of X occurred given that Y is observed (or measured). The ML estimation process (or application) can be executed by a processor associated with a flow sensor (such as controller 35), a smartphone, tablet computer, or server. The ML detector can obtain the observation instance of Y from a flow meter (such as an ultrasonic sensor) and map the observation instance of Y to an instance of X that maximizes the probability p(Y|X). That is $X_{ML}=\mathrm{argmax}_X p(Y|X)$. In the case where the probability p(X) for each X is known (e.g., pdf or pmf of X is known or estimated as part of the statistical model), then the processor can employ a maximum a posteriori probability (MAP) estimation. When employing MAP detection, the processor is configured to select the instance of X that maximizes p(Y|X) p(X). That is $X_{MAP}=\mathrm{argmax}_X p(Y|X)$. By estimating (or detecting) a value for X based on the observation Y, the processor is actually determining whether or not a leak event is present (or occurred).

When generating (or estimating) a Gaussian mixture model (GMM), the computer device can employ training data to model the conditional random vectors X|Y using Gaussian mixtures (or Gaussian clusters) and estimate respective Gaussian probability distributions. Each Gaussian mixture or cluster can be associated with a respective instance of the vector X. Given an observation instance y of the random vector Y, the processor can select the instance of X associated with the cluster leading to the highest p(y|X).

Upon detecting a leak event (at decision block 465), the controller 350 can automatically cause the shut-off valve 120 to be actuated and the fluid flow through the connector 101 to be stopped(step 470). In some implementations, the controller 350 can send a signal to a control circuit associated with the shut-off valve 120 indicative of a detected leak event. Upon receiving such signal, the control circuit can actuate the shut-off valve 120 to a "close" state/position preventing fluid flow through the connector 101. In some implementations, the controller 350 can be configured to control the shut-off valve 120 directly. The controller 350 can be configured to send a signal instructing the shut-off valve 120 to switch to the "close" position, upon detecting a leak event. After detection of a leak event, the controller 350 can signal the leak event to the shut-off valve 120 through a wired connection or a wireless connection (Wi-Fi, Bluetooth, Zig bee). If no leak event is detected at decision block 430, the controller 350 can iterate back to obtaining more measurement signals at step 410.

Figure 6:
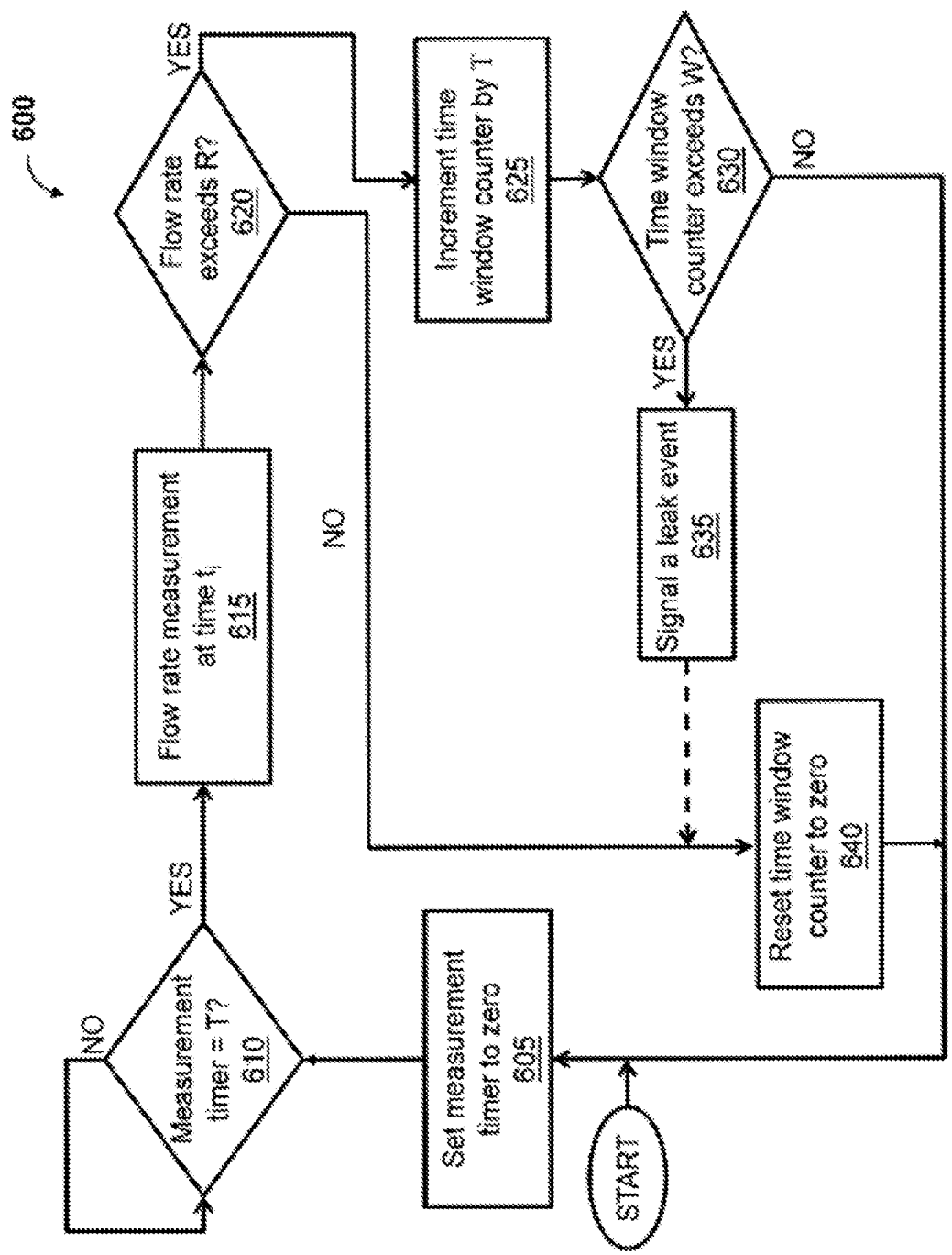
FIG. 6 is a flowchart illustrating a method of detecting leak events based on a flow rate threshold value and a sliding time window.

FIG. 6 is a flowchart illustrating a method 600 of detecting leak events based on a flow rate threshold value and a sliding time window. The method 600 includes the controller 350 setting a measurement timer to zero (step 605), timely measuring a flow rate (decision block 610 and step 615), comparing the measured flow rate to a respective threshold value R (decision block 620), incrementing a time window counter (step 625) and comparing the incremented time window counter to a respective time threshold value W (decision block 630) if the measured flow rate exceeds R. The method 600 also includes signaling a leak event (step 635) upon determining that the time window counter exceeds (or is equal to) the time threshold W at step 630. The method 600 also includes resetting the time window counter (at step 640), if the measured flow rate is determined to be smaller than R at step 620.

Referring to FIGS. 1A-1D, 3 and 6, the method 600 includes the controller 350 setting a measurement timer to zero (step 605). In some implementations, the transducers 310 can periodically (every time period T) transmit and receive ultrasonic signals and the controller 350 can compute a respective flow rate value for each time period T. The controller 350 can employ the measurement timer to determine time instances at which to compute or measure flow rate values. Upon determining that the measurement timer reaches the time value T (step 610), the controller 350 computes a flow rate value based on a measurement signal (step 615). Computing the flow rate value can include computing a signal propagation time based on the measurement signal and deducing the flow rate value from the signal propagation time.

The method 600 includes the controller 350 comparing the computed flow rate to a respective threshold value R (decision block 620). If the computed flow rate is determined to be smaller than the threshold value R, the controller 350 can reset the time window counter (steps 640 and 605) and re-iterate back to step 605. The resetting of the time window counter at step 640 ensures that all flow rate values measured/computed within a time window W exceed the threshold value R for a leak event to be detected. If the computed flow rate is determined to exceed the threshold value R (at decision block 620), the controller 350 can increment the time window counter (step 625) and compare the incremented time window counter to a time window duration W (decision block 630). At this stage, the time window counter exceeding (or is equal to) the window duration W means that each of the flow rate values measured/computed throughout the last time window with time duration W exceeds the flow rate threshold value R. Accordingly, upon determining that the time window counter exceeds (or is equal to) W at decision block 630, the controller 350 can signal the presence of a leak event to the shut-off valve 120 (step 635). Such signaling can include actuating the shut-off valve to a "close" state to block fluid flow from passing through the connector 101 (or lumen). Once closed, a user can cause the shut-off valve to be switched back to an "open" state. In some implementations, the use can act manually on a mechanical component associated with the shut-off valve or generate an electronic command (through the control board 130 or remotely) to open the shut-off valve 120. In response to the shut-off valve being open, the controller 350 can reset the time window counter (step 640) and restart the method 600 at step 605. Upon determining that the time window counter is less than W at decision block 630, the controller 350 determines that the flow rate value exceeding R so far are associated with a time duration less than W, and, therefore, the controller 350 re-iterates back to step 605.

While the method 600 is described with respect to detection of a leak event based on a flow rate threshold value R and a time window W, the same method can be modified to accommodate multiple flow rate threshold values and multiple time windows (e.g., as shown in FIG. 5A). Also, by modifying the method 600 (for instance by replacing step 620 with step for comparing flow rate deviations from a respective mean value to a threshold value ΔR/2), a resulting method for detecting leak events based on steadiness of measured flow rate values (as depicted in FIG. 5B) can be achieved.

The reliability of leak event detection can depend on the accuracy of the computed fluid flow parameter values (such as flow rate values). For instance, inaccuracies in the computed fluid flow parameters can affect the decisions made at decision block 620 of FIG. 6, and therefore can result in more false alarms or missed leak events. One of the factors that can contribute to such inaccuracies is a zero flow offset (or drift) caused by a change in temperature of the fluid or a change in electrical properties of the transducers 310 or electrical circuits associated with the fluid flow monitoring system 100. The controller 350 can estimate such offset during a zero flow state and use the offset estimate to calibrate computed fluid flow parameter values or related parameters.

Figure 7:
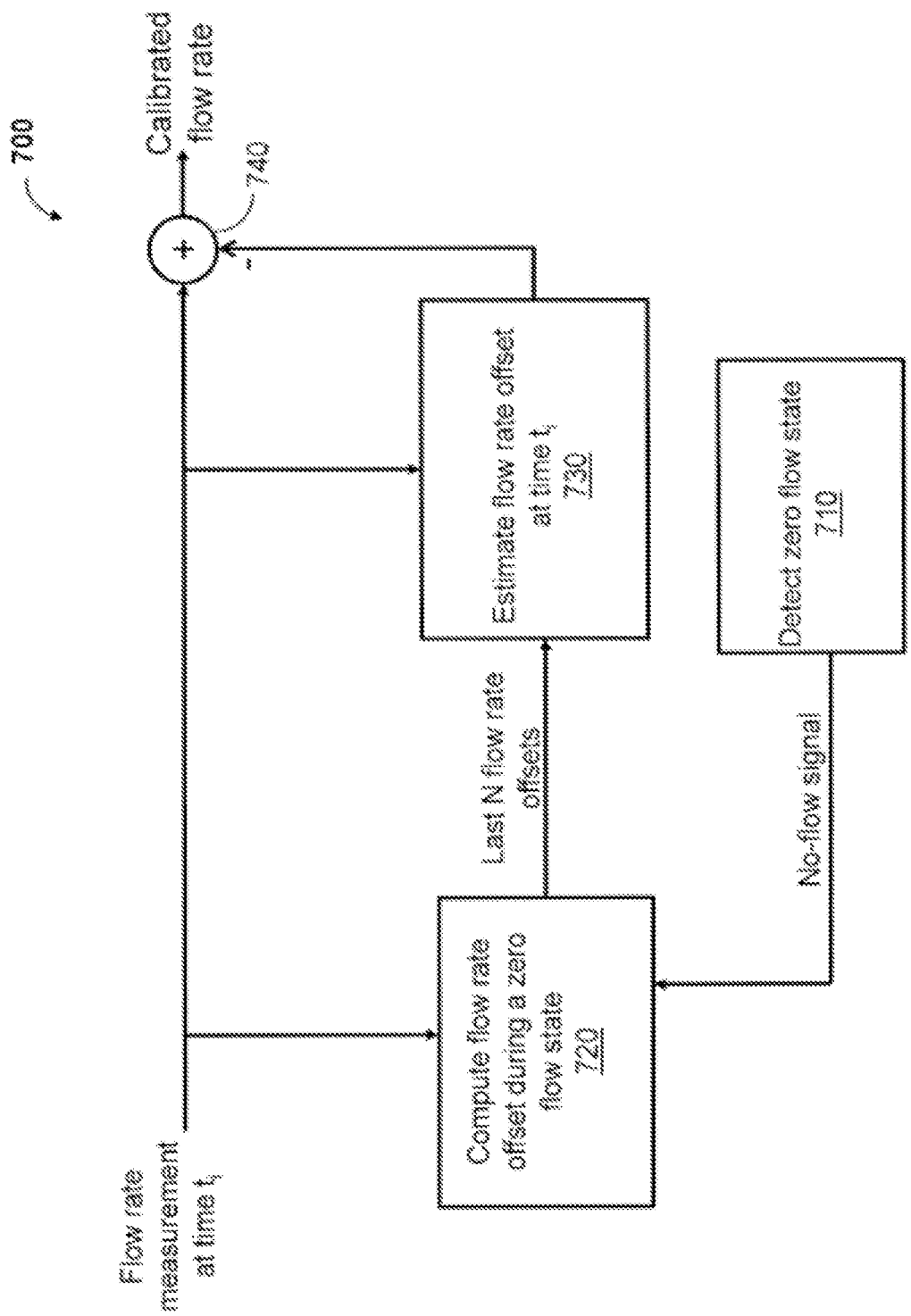
FIG. 7 is a flowchart illustrating a method for calibrating computed flow rate values using an inline leak detector.

FIG. 7 is a flowchart illustrating a method 700 for calibrating computed flow rate values using an inline leak detector. The method 700 includes detecting a zero flow state (step 710), computing one or more flow rate offset values associated with the detected zero flow event (step 720), estimating a flow rate offset at a current time instance based on the one or more flow rate offset values associated with the detected zero flow state (step 730), and calibrating a computed flow rate value using the flow rate offset associated with a current time instance.

Referring to FIGS. 1A-1D and FIG. 7, the fluid flow monitoring system 100 can further include an inline leak detector (or inline flow detector) capable of detecting zero flow states. The method 700 includes detecting a zero flow state (step 710). In some implementations, the inline leak detector can periodically measure fluid flow rate and send a zero flow signal to the controller 350 upon measuring a zero flow rate value (or a flow rate value smaller than a respective threshold). In some implementations, the inline leak detector can periodically send measured flow rate values to the controller 350. The controller 350 can then determine a zero flow state based on flow rate measurements provided by the inline leak detector. In either case, the controller 350 can be configured to determine the presence of a zero flow event upon repeatedly receiving signals indicative of zero flow over a given time window (e.g., 30 seconds, 45 seconds, or one minute). That is, the controller 350 can be configured to determine the presence of a zero flow event only if all signals received from the inline leak detector over the given time window are all indicative of zero-flow.

Once the presence of a zero flow state is detected, the controller 350 can compute one or more flow rate offset values (step 720). In some implementations, while the zero flow state is uninterrupted (e.g., all received signals from inline detector are indicative of zero-flow) over a time period, the controller 350 can compute a number of flow rate values based on a respective number of measurement signals associated with ultrasonic signals transmitted between the transducers 310. The controller 350 can then compute an estimate of the flow rate offset value as an average of the number of computed flow rate values. The controller 350 can also associate the computed flow rate offset value with a time instance at the center (or middle) of the time period over which the number of flow rate values were computed. The controller 350 can repeat the process of estimating a flow rate offset value until the zero flow state ends.

Once the zero flow state ends (e.g., the controller receives a signal indicative of a flow event from the inline leak detector), the controller 350 can use the computed estimates of the flow rate offset to estimate one other flow rate offset value associated with a time instance $t_i$ (step 730). For instance, the controller can employ interpolation (such as liner or quadratic interpolation) to estimate the one other flow rate offset value. The controller 350 can then subtract the one other flow rate offset value from a flow rate value (e.g., computed based on a measured signal obtained from the receive transducer 310b) associated with the time instance $t_i$ (step 740) to generate a calibrated flow rate value.

In some implementations, the controller 350 can be configured to estimate drift in signal propagation time and subtract the estimated drift from signal propagation times computed during flow events. That is, method 700 can be modified so that the computations performed in steps 720, 730 and 740 are performed using ultrasonic propagation time instead of flow rates.

In some implementations, instead of employing an inline leak detector, the controller 350 of the fluid flow monitoring system 100 can be configured to periodically cause the shut-off valve 120 to close and compute one or more estimates of a zero flow drift while the shut-off valve 120 is closed. The controller 350 can then use the estimate(s) of the zero flow drift to calibrate measured fluid flow parameters when the shut-off valve 120 is open again.

Figure 8:
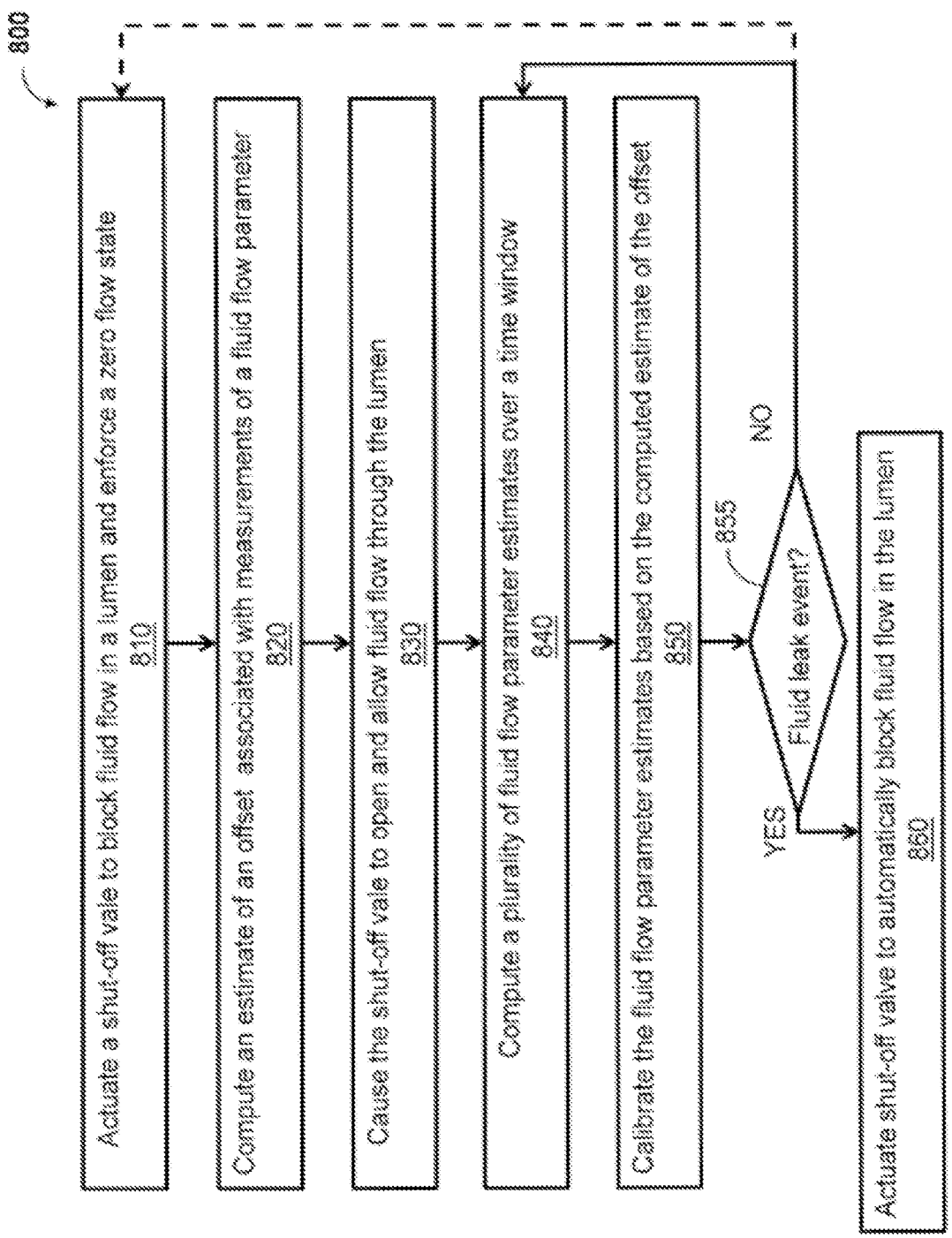
FIG. 8 is a flowchart illustrating a method of monitoring fluid leak events.

FIG. 8 is a flowchart illustrating a method 800 of monitoring fluid leak events. The method 800 includes actuating a shut-off valve to stop fluid flow in a lumen and enforce a zero flow state (step 810), computing an estimate of an offset associated with a fluid flow parameter (step 820), causing the shut-off valve to open and allow fluid flow through the lumen (step 830), computing a plurality of fluid flow parameter estimates (step 840) calibrating the fluid flow parameter estimates based on the computed estimate of the offset (step 850) checking for fluid leak events based on the calibrated fluid flow parameter estimates (decision block 855) and upon detecting a leak event, actuating the shut-off valve to stop fluid flow through the lumen (step 860). If no leak event is detected (at decision block 855), the method 800 loops back to step 840. The steps 810-830 can be repeated (e.g., each time period of a specific duration) obtain new estimates of the offset.

Referring to FIGS. 1A-1D, 3 and 8, the method 800 includes the controller 350 actuating the shut-off valve 120 to stop fluid flow in in the connector 101 (step 810). By actuating the shut-off valve 120 to a "close" state/position, the controller 350 enforces a zero flow state within the connector 101. While the shut-off valve 120 is in the "close" state, the controller 350 can compute an estimate of an offset (or drift) associated with measurements of a fluid flow parameter associated obtained by the fluid flow meter (step 820). The controller 350 can compute the offset estimate is a similar way as described with respect to steps 420 and 430 of FIG. 4. That is, the controller 350 can obtain measurement signals from the fluid flow meter associated with respective ultrasonic signals propagating between the transducers 310 through the fluid in the connector 101. The controller 350 can compute propagation times associated with the obtained measurement signals. The controller 350 can compute one or more values representative of the offset based on differences in signal propagation times for pairs of measurement signals (e.g., each pair includes an upstream and a downstream measurement signals). In some implementations, the controller 350 can compute a plurality of offset values while the shut-off valve 120 is at the "close" position and compute the offset estimate as an average of the computed values.

The method 800 includes the controller 350 causing the shut-off valve 120 to open (step 830). When the shut-off valve 120 is in an "open" state, fluid can flow through the connector 101. The controller 350 can compute a plurality of fluid flow parameter estimates (e.g., as described with regard to steps 440 and 450 of FIG. 4) based on respective measurement signals obtained from the fluid flow meter while the shut-off valve is in the "open" state. The computed estimates can be fluid flow rate estimates, fluid flow velocity estimates or a combination thereof. The controller 350 can then calibrate the computed fluid flow parameter estimates based on the computed offset estimate (step 850), for instance, as described with regard to step 460 of FIG. 4 and FIG. 7. That is, the controller 350 can subtract the offset estimate (computed in step 820) from the fluid flow parameter estimates (computed in step 840).

Using the calibrated fluid flow parameter estimates (computed in step 850), the controller 350 can check for presence of a leak event (decision block 855). The controller 350 can employ any of the methods described with regard to decision block 465 of FIG. 4, FIGS. 5A-5C and FIG. 6 to detect presence of leak events based on the calibrated fluid flow parameter estimates. If a leak event is detected at decision block 855, the controller 350 can automatically actuate the shut-off valve 120 to a "close" state (step 860) to stop fluid flow through the tailpiece 101 and therefore prevent more fluid from leaking off the fluid distribution system. If no leak event is detected at decision block 855, the controller 350 can loop back to step 840 or step 810. In some implementations, the controller 350 can generate and send a warning message indicative of the leak event to a client device (e.g., associate with a user) or a server via a communication interface. In some implementations, the controller 350 can send the warning message without closing the shut-off valve. The controller 350 can be configured to close the shut-off valve upon receiving a confirmation from the client device. In some implementations, a user of client device (or server) can check for the leak event upon receiving the warning message and decide whether or not to manually close the shut-off valve.

Reliability of leak event detection can be negatively affected by variations in fluid pressure or reverse fluid flow. For instance, in a fluid distribution system associated with a multi-level building, fluid in the distribution system may undergo pressure variations due to changes in fluid usage at different levels or units of the building. In particular, units at higher levels may experience a drop in fluid pressure due to simultaneous fluid usage at lower levels. In some cases pressure variations can result in fluid flow in the reverse direction (e.g., from upper levels to lower levels). Flow meters (such as the ultrasonic fluid flow meter) can measure fluid flow in both directions. As such, the reverse fluid flow can lead to false detection of leak events. In some implementations, the fluid flow monitoring system 100 can further include a device for regulating fluid pressure or preventing reverse flow.

FIGS. 9A and 9B are block diagrams of fluid flow monitoring systems 900a and 800b employing pressure regulation. In FIG. 9A, the fluid flow monitoring system 900a includes a pressure regulator (or pressure regulating device) 902 arranged ahead of an ultrasonic flow meter 910. A shut-off valve 920 is arranged after the ultrasonic flow meter 910 (in the direction of positive fluid flow). When the fluid monitoring system 900a is placed at the head of a source line for a unit in a multi-unit building, the pressure regulating device 902 is capable of reducing pressure fluctuations at its output. In particular, if the fluid pressure at the input of the pressure regulating device 902 is larger than a respective pressure setting, the pressure regulating device 902 can reduce pressure fluctuations at its output. For instance, during a non-flow event (e.g., the unit is not driving any fluid flow), the fluid pressure at the output of the pressure regulating device 902 can be steady with little or no fluctuations even if the fluid pressure at the input of the pressure regulating device exhibits some fluctuations.

At FIG. 9B, the fluid flow monitoring system 900b includes a check valve 952 arranged ahead of an ultrasonic flow meter 960. The ultrasonic flow meter 960 is arranged ahead of a shut-off valve 970. The check valve 952 is capable of allowing positive fluid flow and preventing flow in the reverse (or opposite) direction. That is, the check valve 952 can allow fluid flow towards the ultrasonic flow meter 960 and the shut-off valve 970 and stop any fluid flow in the opposite direction.

Figure 9C:
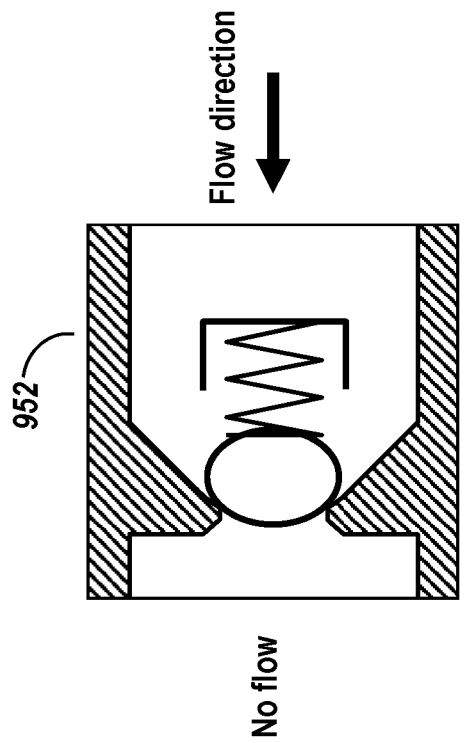
FIGS. 9C and 9D are diagrams of a check valve open and closed states, respectively.
Figure 9D:
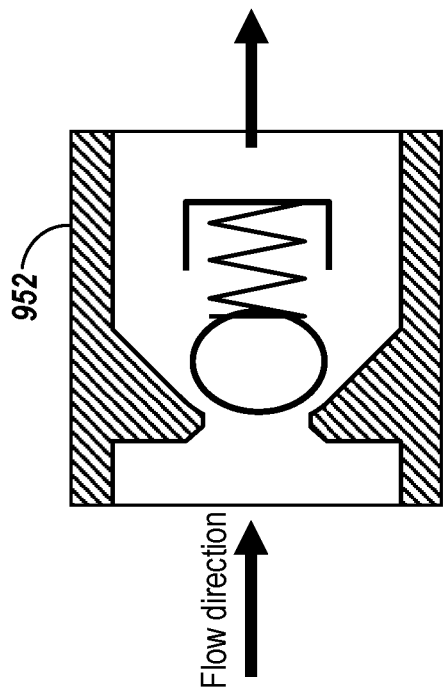
Figure 10A:
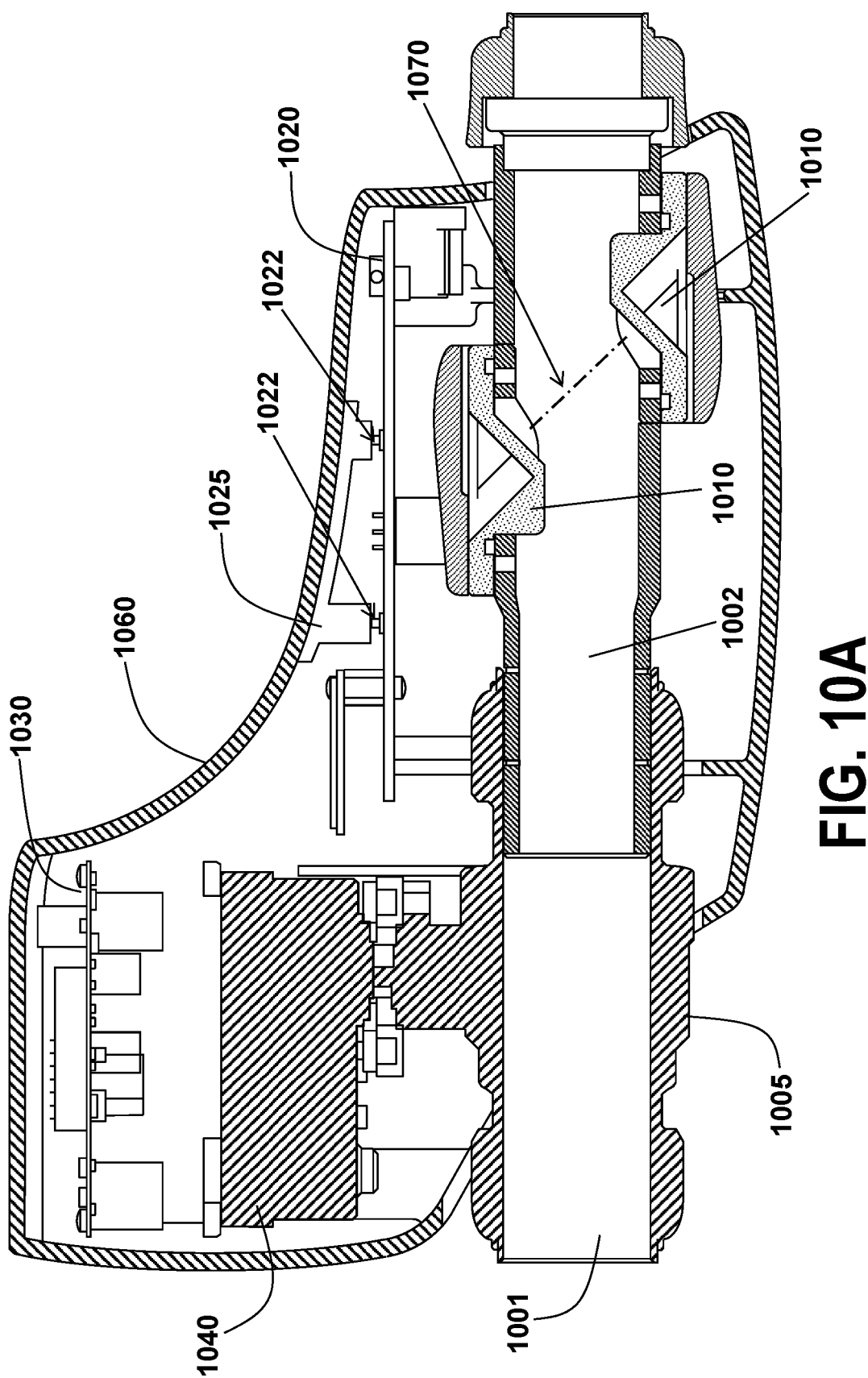
FIGS. 10A-10F show diagrams illustrating a device including an ultrasonic flow sensor and an automatic (or electro-mechanical) shut-off valve.
Figure 10B:
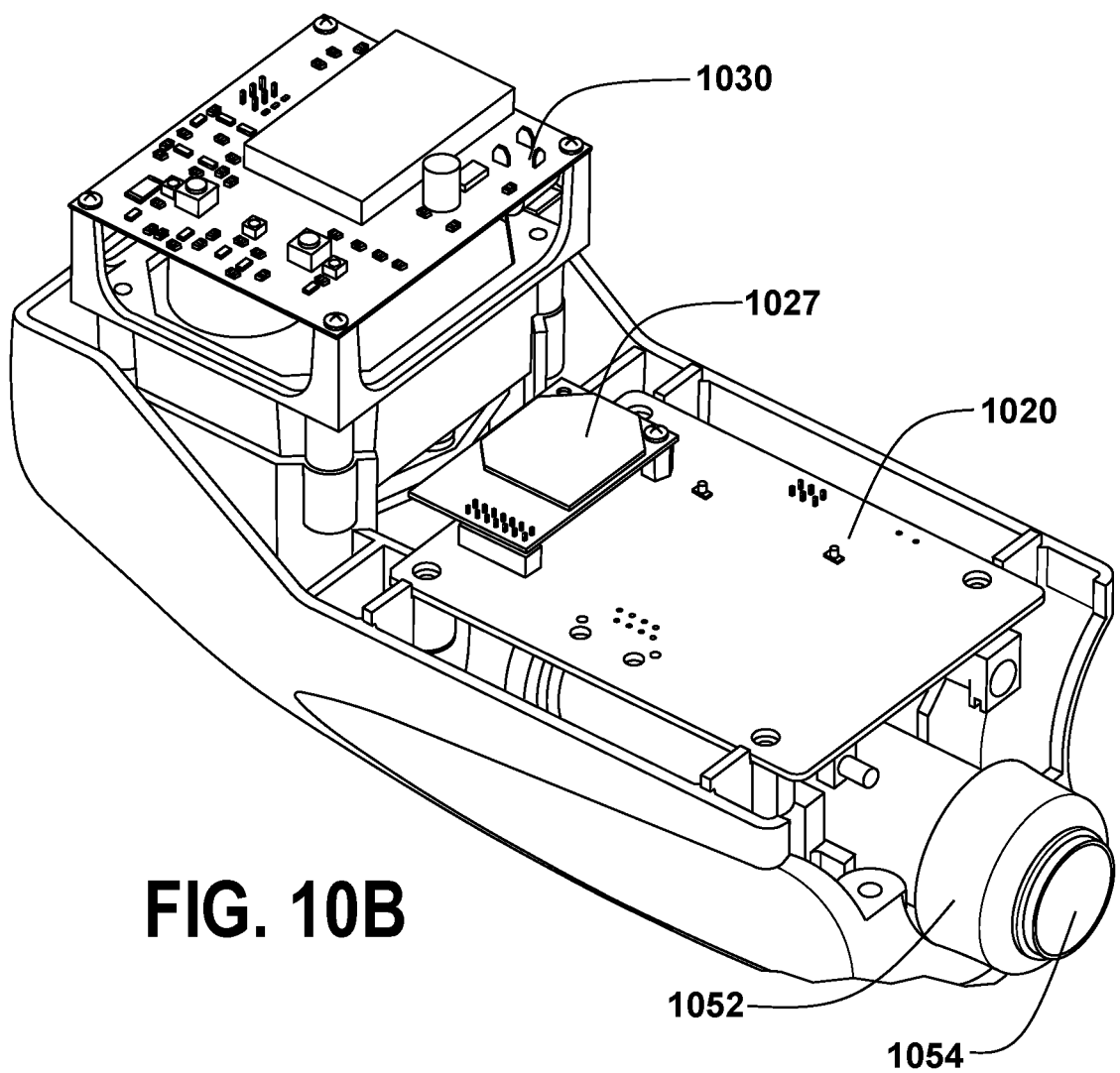
Figure 10C:
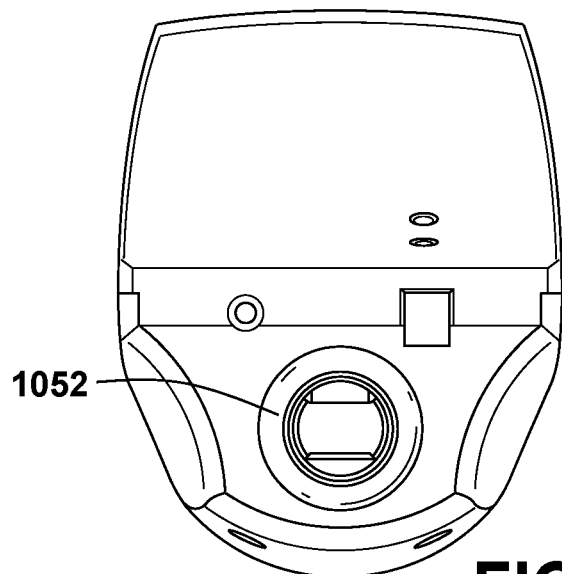
Figure 10D:
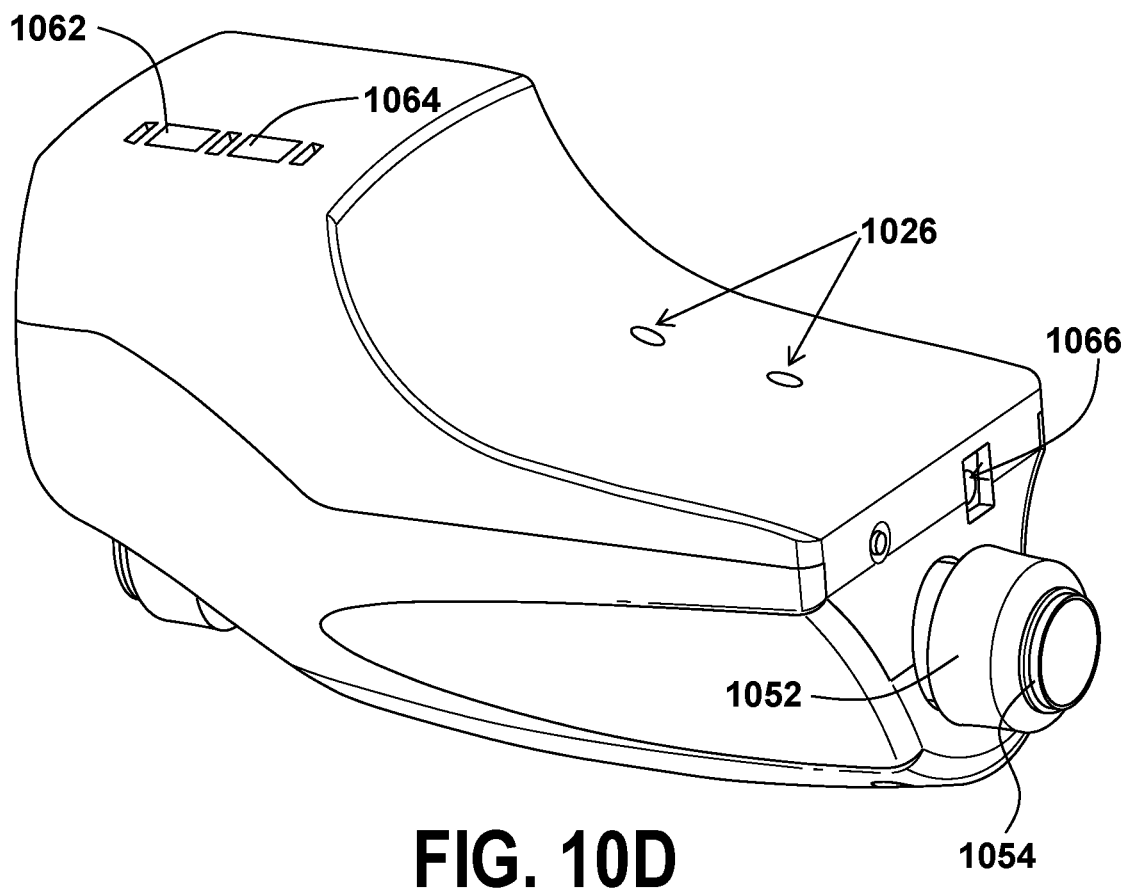
Figure 10E:
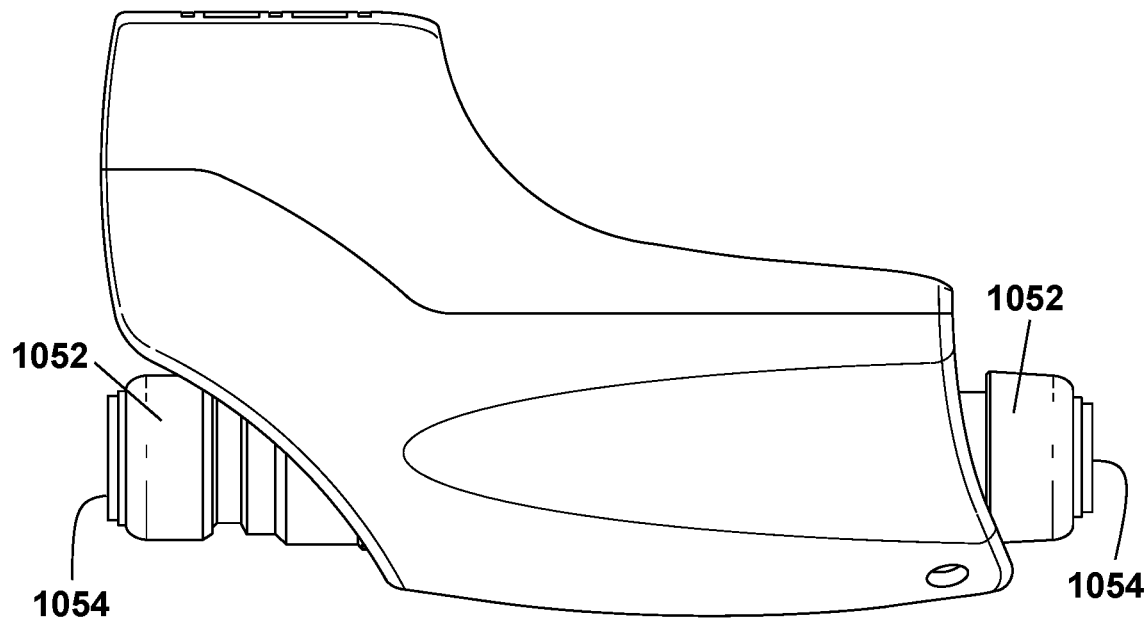
Figure 10F:
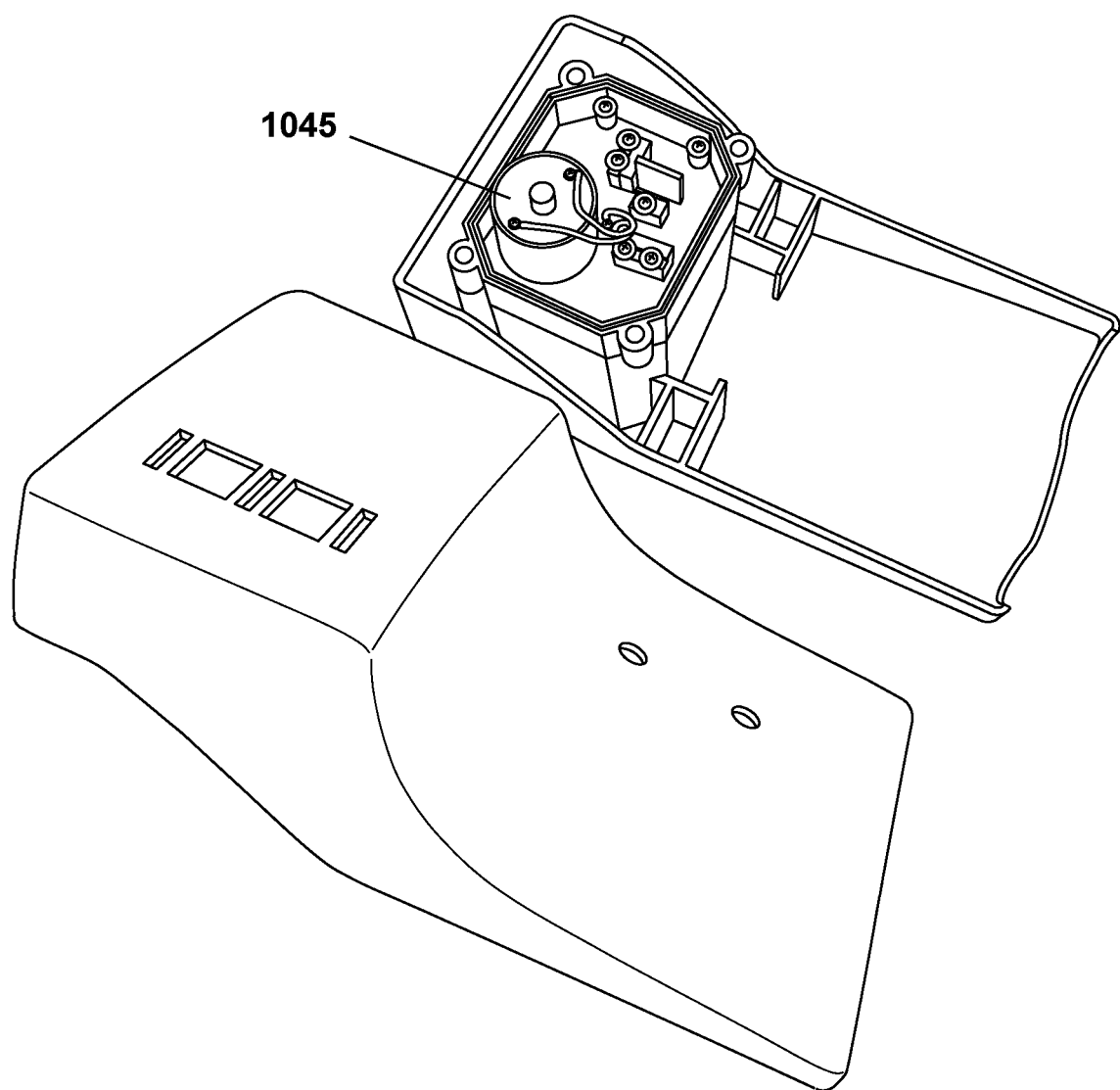

FIGS. 9C and 9D are diagrams of a check valve 952 open and closed states. The check valve 952 includes a ball arranged toward an opening associated with the input of the check valve 952 and coupled to a spring. A positive fluid flow can push the ball away from the opening allowing fluid to pass through the opening and into the check valve 952. However, a flow in the opposite direction can exhibit pressure on the spring causing the ball to be pushed against the opening. As such, the opening can be closed by the ball preventing any fluid to exit the check valve 952.

FIGS. 10A-10F show diagrams illustrating a device including an ultrasonic flow sensor and an automatic (or electro-mechanical) shut-off valve mounted to two tail pieces 1002 and 1001, respectively. Both tailpieces can be coupled to each other through a pipe fitting (e.g., NPT fitting) 1005. Using two tailpieces can allow for separate manufacturing, and testing of the shut-off valve component and the flow sensor component. The transducers of the ultrasonic sensor are mounted to the tailpiece 1002 through transducer blocks 1010 according to a "Z" configuration, such that a direct signal path 1070 between the transducers is at about 45 degrees with respect to a longitudinal axis of the tailpiece 1002. A control circuit board 1020 is associated with the ultrasonic flow sensor while a control circuit board 1030 is associated with the shut-off valve. The control circuit board 1020 includes light emission devices (LEDs) 1022 that can signal health of the ultrasonic sensor, health of the radio communication center card, battery charge or strength of radio signals strength through openings 1026 in the cover 1060 of the device. Light from the LEDs 1022 can travel through a light pipe 1025 to exit at the openings 1026.

The shut-off valve motor and gearing assembly 1040 includes the shut-off valve motor 1045. The tailpieces 1002 and 1001 can be coupled to pipes (or other lumens) through a push connector 1052 and a SHARKBITE connector 1054. The cover 1060 can include buttons 1062 and 1064 for manually closing or opening the shut-off valve. The cover can also include a rest button 1066 for manually resetting the device (or setting the ultrasonic flow sensor to zero-flow).

Figure 11A:
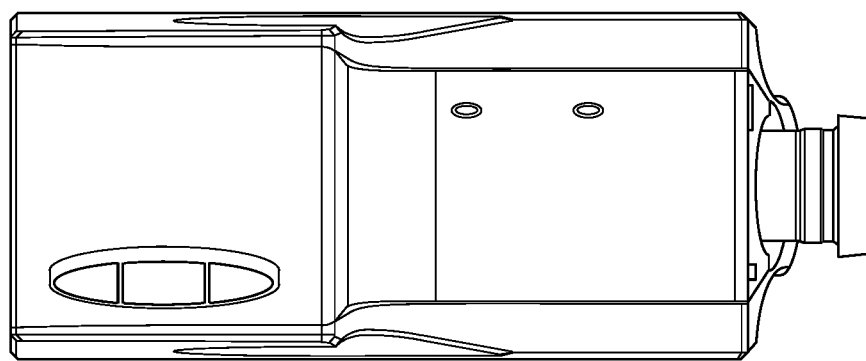
FIGS. 11A-11C show different vies of another implementation of device including an ultrasonic flow sensor and an automatic (or electro-mechanical) shut-off valve.
Figure 11B:
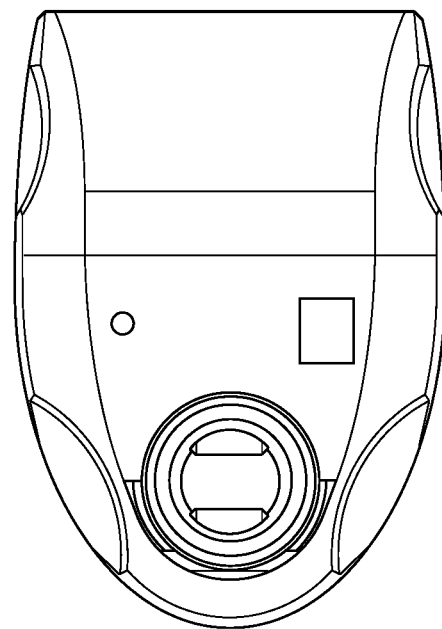
Figure 11C:
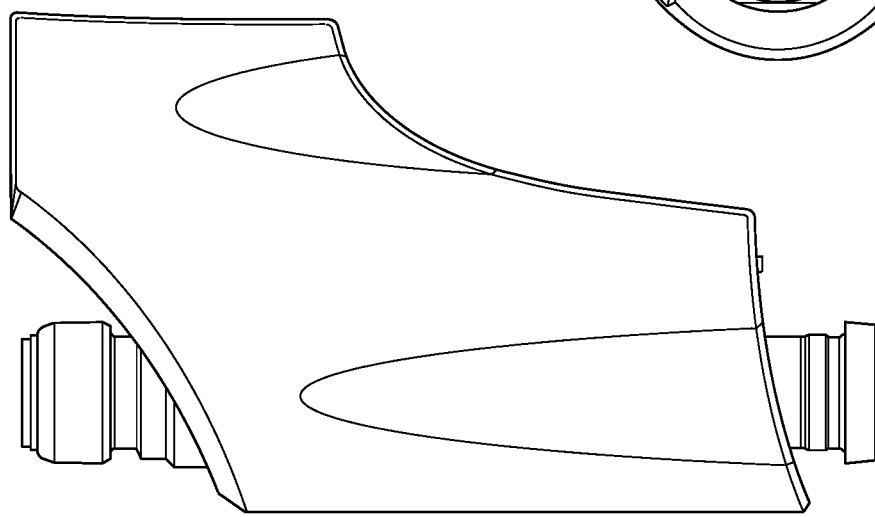

FIGS. 11A-11C show different vies of another implementation of device including an ultrasonic flow sensor and an automatic (or electro-mechanical) shut-off valve.

Figure 12:
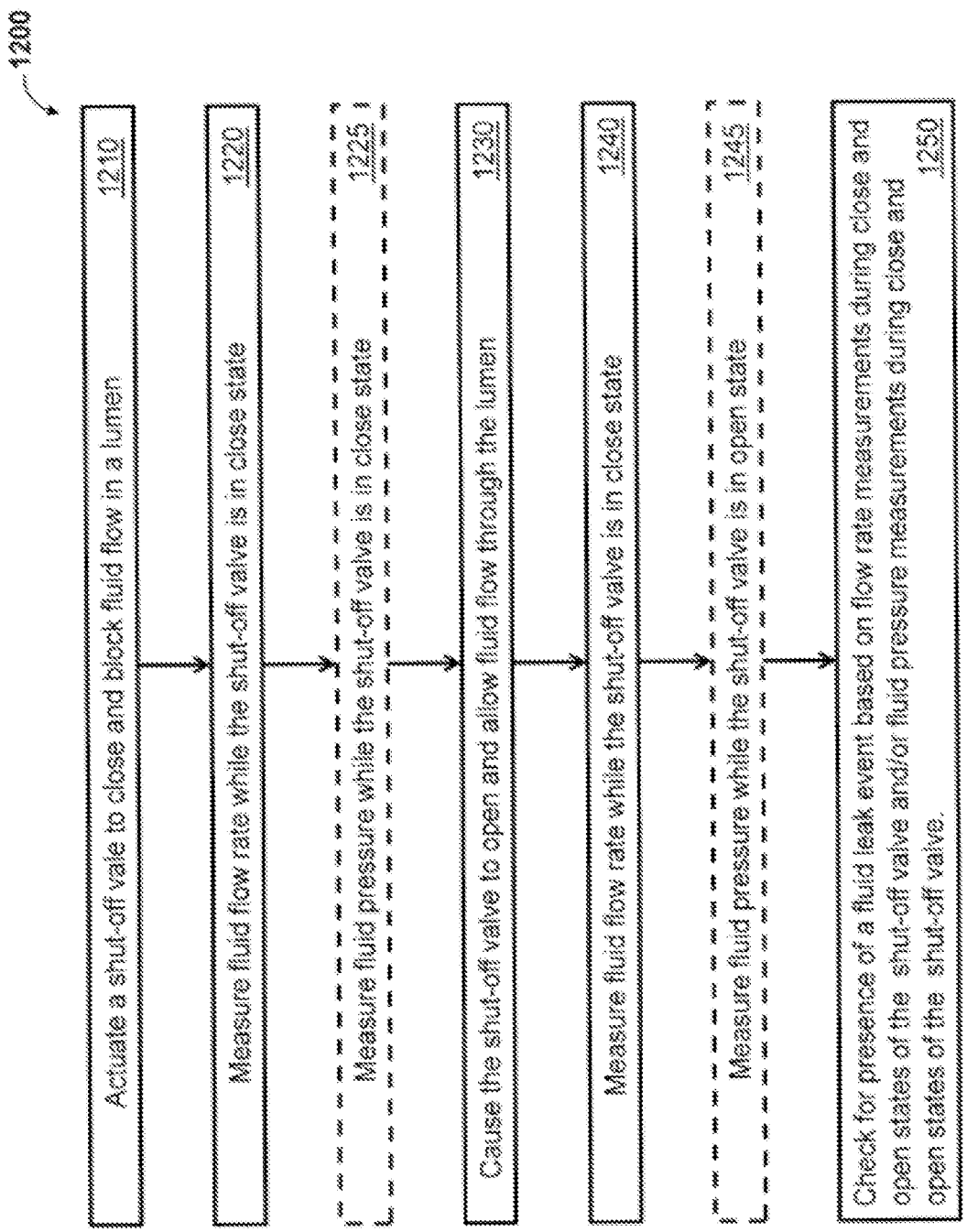
FIG. 12 shows a flow diagram illustrating a method 1200 for detecting leak events in a fluid distribution system.

FIG. 12 shows a flow diagram illustrating a method 1200 for detecting leak events in a fluid distribution system. The method 1100 can include the controller 350 actuating the shut-off valve 120 to close and block fluid flow through the tailpiece 101 or 201, or a lumen in general (step 1210). In some implementations, the controller 350 can be configured to close the shut-off valve during a zero-flow state. For instance, the controller 350 can identify (or detect) a zero-flow state based on flow rate (or flow velocity) measurements obtained before closing the shut-off valve 120. In some implementations, the controller 350 can identify a zero-flow state based on a signal received from an inline leak detector arranged in the lumen. The controller 350 can send a signal to the shut-off valve 120 (or a control circuit thereof) requesting closing of the shut-off valve 120.

The method 1200 can include the controller 350 measuring fluid flow rate (or fluid flow velocity) while the shut-off valve 120 is closed (step 1220). For instance, the controller 350 can cause the transducers 310 to transmit one or more TX signals and receive one or more respective RX signals. Using the one or more RX signals (or samples thereof), the controller 350 can compute one or more measurements of fluid flow rate (or fluid flow velocity), for instance, as discussed above with respect to FIG. 3. In some implementations, the controller 350 can be configured to obtain a plurality of measurements of the flow rate (or flow velocity) while the shut-off valve 120 is closed. Using multiple measurements of the fluid flow rate (or flow velocity) can allow for more reliable detection of leak events (compared to using measurements). In some implementations, another type of flow sensor can be employed instead of an ultrasonic flow sensor.

The method 1200 can include the controller 350 obtaining one or more measurements of fluid pressure from a pressure sensor while the shut-off valve 120 is closed (step 1225). In some implementations, the pressure sensor can be arranged (e.g., integrated in the lumen) downstream of the shut-off valve 120. That is, the pressure sensor is arranged such that when the shut-off valve is open, fluid flow passes by the shut-off valve before passing by the pressure sensor. In some implementations, the controller 350 can be configured to obtain multiple measurements of fluid pressure from the pressure sensor while the shut-off valve is closed. In some implementations, the controller 350 can obtain both flow rate (or flow velocity) measurements and fluid pressure measurements. In some implementations, the controller 350 can be configured to obtain flow rate (or flow velocity) measurements while omitting step 1225. In some implementations, the controller 350 can be configured to obtain fluid pressure measurements while omitting step 1220).

The method 1200 can include the controller 350 causing the shut-off valve to pen and allow fluid flow through the lumen (step 1230). For instance, after obtaining flow rate (or flow velocity) measurements and/or fluid pressure measurements, the controller 350 can instruct the shut-off valve (either directly or via a control circuit associated with the shut-off valve 120) to open.

The method 1200 can include the controller 350 measuring fluid flow rate (or fluid flow velocity) while the shut-off valve 120 is in open state (step 1240). Similar to step 1220, the controller 350 can cause the transducers 310 to transmit one or more TX signals and receive one or more respective RX signals. Using the one or more RX signals (or samples thereof), the controller 350 can compute one or more measurements of fluid flow rate (or fluid flow velocity). In some implementations, the controller 350 can be configured to obtain a plurality of measurements of the flow rate (or flow velocity) while the shut-off valve 120 is closed. Using multiple measurements of the fluid flow rate (or flow velocity) can allow for more reliable detection of leak events (compared to using measurements). In some implementations, another type of flow sensor can be employed instead of an ultrasonic flow sensor.

The method 1200 can include the controller 350 obtaining one or more measurements of fluid pressure from a pressure sensor while the shut-off valve 120 is in open state (step 1245). In some implementations, the controller 350 can be configured to obtain multiple measurements of fluid pressure from the pressure sensor while the shut-off valve is closed. In some implementations, the controller 350 can obtain both flow rate (or flow velocity) measurements (step 1240) and fluid pressure measurements (step (1245). In some implementations, the controller 350 can be configured to obtain flow rate (or flow velocity) measurements (step (1240) while omitting step 1245. In some implementations, the controller 350 can be configured to obtain fluid pressure measurements (step 1240) while omitting step 1220).

The method 1200 can include the controller 350 checking for presence of a leak event based on the fluid flow measurements (e.g., flow rate or flow velocity measurements) obtained when the shut-off valve is closed at step 1220 and when the shut-off valve is open at step 1240 (step 1250). For instance the controller 350 can compare a mean value, a median value, or a selected measurement value associated with the measurements obtained at step 1240 to a mean value, median value, or selected measurement value associated with measurements obtained at step 1220, respectively. The controller 350 can compute the difference between the compared values and compare the difference to a threshold value. If the difference is larger than the threshold value, then the controller can determine presence of a leak event. In some implementations, the threshold value can be equal to 0.5 GPM, 0.75 GPM or 1.0 GPM. In some implementations, the threshold value can depend on the type of fluid, the size of the lumen or a combination thereof.

When there is a leak event, fluid can leak while the shut-off vale is closed creating empty space in the pipes. When the shut-off valve is open again, there will be a surge in flow rate to replace the fluid that leaked out of the pipes. That is, if there is a leak event, flow measurements obtained after opening the shut-off valve will be greater than those obtained before opening the shut-off valve. A similar scenario is applicable for the fluid pressure. That is, fluid pressure drops after closing the shut-off valve and increases again after reopening the shut-off valve. In some implementations, the controller 350 compare measurements of fluid pressure obtained at step 1225 to fluid pressure measurements obtained at step 1245. The controller 350 can compute a difference value (e.g., between mean values, between median values or between selected measurement values) associated with pressure measurements obtained at step 1245 and pressure measurements obtained at step 1225. The controller 350 can compare the difference to a pressure threshold value (e.g., 10 pounds-per-inch (PSI), 15 PSI, 20 PSI or other threshold value). If the difference is larger than the threshold value, the controller 350 can determine presence of a leak event. In some implementations, the controller 350 can be configured to obtain and collect pressure values before and after closing the shut-off valve. In such implementations, a leak is detected when a drop in pressure (after closing the shutoff valve compared to before closing the shutoff valve) is determined. In some implementations, the controller can employ the comparison of pressure values together with the comparison of flow measurements to determine whether or not a leak event occurred. For instance, the controller 350 can determine presence of a leak event only if both a substantial change in fluid flow rate (larger than threshold value) a substantial change in fluid pressure (larger than pressure threshold value) are detected. In some implementations, the controller 350 can detect a leak based on pressure measurements only. If a leak is detected, the controller 350 can either close the shut-off valve, send a warning message to an external device (e.g., client device or server) or do both.

In some implementations, the controller 350 can compare pressure measurements obtained when the shut-off valve is open to another pressure threshold value (e.g. 80 PSI, 85 PSI, 90 PSI, 25% of a normal pressure value, or other value) to determine whether or not the pressure is normal. In some implementations, the pressure threshold value can depend on the size of the pipes, the type of fluid or a combination thereof. If pressure is detected to be higher than the threshold value, the controller 350 can send a warning message indicating possible failure of a pressure regulator.

It should be understood that the systems described above may provide multiple ones of any or each of those components and these components may be provided on either a standalone machine or, in some embodiments, on multiple machines in a distributed system. In addition, the systems, methods, and engines described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

A flow diagram is used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

While the invention has been particularly shown and described with reference to specific embodiments, it should be understood by those skilled in the art that various changes in form and detail may be made therein without departing from the spirit and scope of the invention as defined by the following claims. For example, the manifolds disclosed herein may be used to monitor flow rates of fluids other than water, such as oil, gasoline, etc.

What is claimed is:

1. A system comprising:
    a first tubular portion defining a first opening for receiving a first transducer holder and a second opening for receiving a second transducer holder, the first opening and the second opening aligned along a line intersecting with a longitudinal axis of the first tubular system portion:
    a second tubular portion defining a cavity having a first diameter larger than a second diameter of the first tubular portion and sized to receive a shut-off valve;
    a first check valve coupled with and upstream from the first tubular portion, the first check valve allowing fluid flow only in a single first direction through the first tubular portion; and
    a controller:
        receiving, via a wireless connection, measurement signals corresponding to a fluid flow rate through the first tubular portion;
        determining, based on the measurement signals, that the fluid flow rate exceeds a predetermined threshold in excess of a predetermined amount of time;
        closing the shut-off valve responsive to determining that the fluid flow rate exceeds the predetermined threshold for the predetermined amount of time; and
        transmitting, using the wireless connection, a status of the shut-off valve.

2. The system of claim 1, wherein the shut-off valve comprises:
    a ball valve that controls the fluid flow through the cavity defined by the second tubular portion, the ball valve having a third opening, and wherein when the ball valve is in a first position, the third opening is aligned with the longitudinal axis of the first tubular portion and when the ball valve is in a second position, the third opening is perpendicular to the longitudinal axis of the first tubular portion.

3. The system of claim 1, wherein the shut-off valve comprises:
an electro-mechanical valve coupled with the controller, the controller operates the electro-mechanical valve responsive to the fluid flow rate through the cavity defined by the second tubular portion.

4. The system of claim 1, comprising:
a pressure regulation valve coupled with the first tubular portion, the pressure regulation valve having an input and an output, the pressure regulation valve detects a first fluid pressure between the input and the output, and the pressure regulation valve compares the first fluid pressure to a predetermined fluid pressure setting for the cavity defined by the first tubular portion.

5. The system of claim 1, comprising:
a pressure regulation valve coupled with the first tubular portion, the pressure regulation valve having an input and an output, and the pressure regulation valve that modifies a first fluid pressure through the cavity defined by the first tubular portion such that the first fluid pressure at the input is different than a second fluid pressure at the output.

6. The system of claim 1, wherein the first check valve allows the fluid flow through the cavity defined by the second tubular portion in a first position and the first check valve prevents the fluid flow through the cavity defined by the second tubular portion in a second position.

7. The system of claim 1, wherein the first check valve comprises a first position ball coupled with a spring, wherein when the ball and the spring are in a first position, the first check valve can allow the fluid flow through the cavity defined by the second tubular portion and when the ball and the spring are in a second position, the first check valve can prevent the fluid flow through the cavity defined by the second tubular portion.

8. The system of claim 1, comprising:
an ultrasonic sensor for generating the measurement signals corresponding to the fluid flow rate through the first tubular portion, the ultrasonic sensor coupled with the first tubular portion through the first opening or the second opening.

9. The system of claim 8, wherein the ultrasonic sensor comprises:
a first ultrasonic transducer disposed within the first transducer holder and coupled with the first opening, and a second ultrasonic transducer disposed within the second transducer holder and coupled with the second opening.

10. The system of claim 8, comprising:
the controller communicatively coupled to the ultrasonic sensor and the shut-off valve, the controller actuating the shut-off valve responsive to the fluid flow rate through the first tubular portion.

11. A method for controlling fluid flow comprising:
receiving, by a controller, via a wireless connection, measurement signals corresponding to a fluid flow rate of fluid flow through a first tubular portion, the first tubular portion defining a first opening for receiving a first transducer holder and a second opening for receiving a second transducer holder, the first opening and the second opening aligned along a line intersecting with a longitudinal axis of the first tubular portion;
determining, by the controller, based on the measurement signals, that the fluid flow rate exceeds a predetermined threshold in excess of a predetermined amount of time;
closing, by the controller, a shut-off valve responsive to determining that the fluid flow rate exceeds the predetermined threshold for the predetermined amount of time, the shut-off valve disposed in a second tubular portion, the second tubular portion defining a cavity having a first diameter larger than a second diameter of the first tubular portion; and
transmitting, by the controller, using the wireless connection, a status of the shutoff valve; and
preventing, by a check valve coupled with and upstream from the first tubular portion, reversal fluid flow through the first tubular portion.

12. The method of claim 11, comprising:
controlling, by a ball valve coupled with the first tubular portion, the fluid flow through the cavity defined by the second tubular portion, the ball valve having a third opening, and wherein when the ball valve is in a first position, the third opening is aligned with the longitudinal axis of the first tubular portion and when the ball valve is in a second position, the third opening is perpendicular to the longitudinal axis of the first tubular portion.

13. The method of claim 11, comprising:
generating, by the controller coupled with the first tubular portion, a control signal responsive to the fluid flow rate;
modifying, by the controller, a position of the shut-off valve using the responsive to the control signal.

14. The method of claim 11, comprising:
controlling the fluid flow through the second tubular portion, the check valve allows the fluid flow through the second tubular portion in a first position and the check valve prevents the fluid flow through the second tubular portion in a second position.

15. The method of claim 11, comprising:
controlling the fluid flow through the first tubular system portion, the check valve having a ball coupled with a spring, wherein when the ball and the spring are in a first position, the check valve can allow the fluid flow through the cavity defined by the second tubular portion and when the ball and the spring are in a second position, the check valve can prevent the fluid flow through the cavity defined by the second tubular portion.

16. The method of claim 11, comprising:
measuring, by an ultrasonic sensor, the fluid flow rate though the first tubular portion; and
generating, by the ultrasonic sensor, the measurement signals corresponding to the fluid flow rate though the first tubular portion.

17. The method of claim 16, comprising:
determining, by the controller coupled with the first tubular portion, a plurality of fluid flow parameter estimates based on the measurement signals generated by the ultrasonic sensor; and
actuating, by the controller, a position of the shut-off valve responsive to the plurality of fluid flow parameter estimates.

* * * * *